United States Patent
Sun et al.

(10) Patent No.: US 10,831,707 B2
(45) Date of Patent: Nov. 10, 2020

(54) VIRTUAL PARTITIONS IN VIRTUAL DATABASES

(71) Applicant: Delphix Corporation, Redwood City, CA (US)

(72) Inventors: Hubert Ken Sun, Menlo Park, CA (US); Henrik Mattsson, San Francisco, CA (US)

(73) Assignee: Delphix Corp., Menlo Park, CA (US)

( * ) Notice: Subject to any disclaimer, the term of this patent is extended or adjusted under 35 U.S.C. 154(b) by 332 days.

(21) Appl. No.: 15/972,359

(22) Filed: May 7, 2018

(65) Prior Publication Data

US 2019/0012321 A1 Jan. 10, 2019

Related U.S. Application Data

(63) Continuation of application No. 14/657,708, filed on Mar. 13, 2015, now Pat. No. 9,990,366.

(51) Int. Cl.
  *G06F 16/11* (2019.01)
  *G06F 16/21* (2019.01)
  *G06F 16/25* (2019.01)
  *G06F 16/27* (2019.01)

(52) U.S. Cl.
  CPC .......... *G06F 16/128* (2019.01); *G06F 16/219* (2019.01); *G06F 16/256* (2019.01); *G06F 16/278* (2019.01)

(58) Field of Classification Search
  CPC .............................. G06F 16/256; G06F 16/219
  See application file for complete search history.

(56) References Cited

U.S. PATENT DOCUMENTS

| | | | |
|---|---|---|---|
| 4,853,843 | A | 8/1989 | Ecklund |
| 5,819,292 | A | 10/1998 | Hitz et al. |
| 6,523,036 | B1 | 2/2003 | Hickman et al. |
| 7,107,385 | B2 | 9/2006 | Rajan et al. |

(Continued)

FOREIGN PATENT DOCUMENTS

JP  2005-532611 A  10/2005

OTHER PUBLICATIONS

Boppana, U., "Using FlexClone to Clone Files and LUNs," NetApp Technical Report, Mar. 2010, 32 Pages.

(Continued)

*Primary Examiner* — William Spieler
(74) *Attorney, Agent, or Firm* — Fenwick & West LLP

(57) ABSTRACT

Information from source databases is retrieved and stored on a database storage system. Multiple point-in-time copies are obtained for each database. A source database may contain partitions comprising sets of database tables. A partition is imported into a virtual database created. The database storage system validates the partition before importing, by checking whether the partition includes database tables that refer to database tables outside the partition. A partition imported in a virtual database may be rewinded to an older state or refreshed to a more recent state. Multiple partitions may be included in a virtual database and the state of each partition modified independent of the state of the remaining virtual database including the other partitions. Multiple versions of the same partition corresponding to different points in time are incorporated in the same virtual database, thereby allowing a query to process different versions of the same database table.

21 Claims, 13 Drawing Sheets

(56) References Cited

U.S. PATENT DOCUMENTS

| | | | |
|---|---|---|---|
| 7,225,204 B2 | 5/2007 | Manley et al. |
| 7,334,094 B2 | 2/2008 | Fair |
| 7,334,095 B1 | 2/2008 | Fair et al. |
| 7,340,461 B2 | 3/2008 | Vishlitzky et al. |
| 7,373,364 B1 | 5/2008 | Chapman |
| 7,386,695 B2 | 6/2008 | Fuente |
| 7,409,511 B2 | 8/2008 | Edwards et al. |
| 7,457,982 B2 | 11/2008 | Rajan |
| 7,539,836 B1 | 5/2009 | Klinkner |
| 7,587,563 B1 | 9/2009 | Teterin et al. |
| 7,590,660 B1 | 9/2009 | Richards et al. |
| 7,631,021 B2 | 12/2009 | Sarma et al. |
| 7,653,665 B1 | 1/2010 | Stefani et al. |
| 7,743,035 B2 | 6/2010 | Chen et al. |
| 7,757,056 B1 | 7/2010 | Fair |
| 7,822,758 B1 | 10/2010 | Prakash et al. |
| 7,827,366 B1 | 11/2010 | Nadathur et al. |
| 7,856,424 B2 | 12/2010 | Cisler et al. |
| 7,877,357 B1 | 1/2011 | Wu et al. |
| 7,937,547 B2 | 5/2011 | Liu et al. |
| 7,941,470 B2 | 5/2011 | Le et al. |
| 7,996,636 B1 | 8/2011 | Prakash et al. |
| 8,037,032 B2 | 10/2011 | Pershin et al. |
| 8,150,808 B2 | 4/2012 | Zha et al. |
| 8,280,858 B2 | 10/2012 | Ahrens et al. |
| 8,311,988 B2 | 11/2012 | Cisler et al. |
| 8,412,746 B2 | 4/2013 | Fox et al. |
| 8,532,973 B1 | 9/2013 | CaraDonna et al. |
| 8,543,621 B2 | 9/2013 | Butcher et al. |
| 8,775,663 B1 | 7/2014 | Singh |
| 8,788,461 B2 | 7/2014 | Stewart et al. |
| 2002/0083037 A1 | 6/2002 | Lewis et al. |
| 2008/0307345 A1 | 12/2008 | Hart et al. |
| 2009/0222496 A1 | 9/2009 | Liu et al. |

OTHER PUBLICATIONS

Chapman et al., "SnapMirror® Best Practices Guide, NetApp, Inc. Technical Report TR-3446," Apr. 2006, 63 Pages.
Creek, T., "Applications for Writeable LUNs and LUN Cloning in Oracle Environments," NetApp, Technical Report, Jun. 2003, 10 Pages.
Declaration of Erez Zadok in Support of Petition for Inter Partes Review of U.S. Pat. No. 8,150,808, Oct. 2, 2014, 78 Pages.
Declaration of Erez Zadok in Support of Petition for Inter Partes Review of U.S. Pat. No. 8,150,808, Oct. 2, 2014, 84 Pages.
Declaration of Erez Zadok in Support of Petition for Inter Partes Review of U.S. Pat. No. 8,150,808, Oct. 2, 2014, 85 Pages.
Declaration of Erez Zadok in Support of Petition for Inter Partes Review of U.S. Pat. No. 8,150,808, Oct. 6, 2014, 97 Pages.
Declaration of Erez Zadok in Support of Petition for Inter Partes Review of U.S. Pat. No. 8,161,077, Oct. 6, 2014, 87 Pages.
Declaration of Erez Zadok in Support of Petition for Inter Partes Review of U.S. Pat. No. 8,161,077, Oct. 6, 2014, 95 Pages.
Declaration of Erez Zadok in Support of Petition for Inter Partes Review of U.S. Pat. No. 8,468,174, Oct. 23, 2014, 98 Pages.
Declaration of Erez Zadok in Support of Petition for Inter Partes Review of U.S. Pat. No. 8,468,174, Oct. 23, 2014, 99 Pages.
Declaration of Erez Zadok in Support of Petition for Inter Partes Review of U.S. Pat. No. 8,548,944, Oct. 7, 2014, 98 Pages.
Declaration of Erez Zadok in Support of Petition for Inter Partes Review of U.S. Pat. No. 8,548,944, Oct. 8, 2014, 98 Pages.
Declaration of Erez Zadok in Support of Petition for Inter Partes Review of U.S. Pat. No. 8,566,361, Oct. 21, 2014, 84 Pages.
Declaration of Erez Zadok in Support of Petition for Inter Partes Review of U.S. Pat. No. 8,566,361, Oct. 21, 2014, 99 Pages.
Degwekar, A., "Using SnapMirror with SnapDrive for UNIX," NetApp Technical Report, 2007, 11 Pages.
Edwards, et al., "FlexVol: Flexible, Efficient File Volume Virtualization in WAFL," Jun. 22, 2008, 22 Pages.

Final Written Decision, Before the Patent Trial and Appeal Board of United States Patent and Trademark Office, Case IPR2015-00014, U.S. Pat. No. 8,150,808 B2, Apr. 13, 2016, 92 Pages.
Final Written Decision, Before the Patent Trial and Appeal Board of United States Patent and Trademark Office, Case IPR2015-00016 & IPR2015-00019, U.S. Pat. No. 8,150,808 B2, Apr. 13, 2016, 107 Pages.
Final Written Decision, Before the Patent Trial and Appeal Board of United States Patent and Trademark Office, Case IPR2015-00025 & IPR2015-00026, U.S. Pat. No. 8,161,077 B2, Apr. 12, 2016, 94 Pages.
Final Written Decision, Before the Patent Trial and Appeal Board of United States Patent and Trademark Office, Case IPR2015-00034, U.S. Pat. No. 8,150,808 B2, Apr. 16, 2016, 100 Pages.
Final Written Decision, Before the Patent Trial and Appeal Board of United States Patent and Trademark Office, Case IPR2015-00050, U.S. Pat. No. 8,548,944 B2, Mar. 31, 2016, 26 Pages.
Final Written Decision, Before the Patent Trial and Appeal Board of United States Patent and Trademark Office, Case IPR2015-00052, U.S. Pat. No. 8,548,944 B2, Mar. 31, 2016, 25 Pages.
Final Written Decision, Before the Patent Trial and Appeal Board of United States Patent and Trademark Office, Case IPR2015-00108, U.S. Pat. No. 8,566,361 82, Apr. 29, 2016, 61 Pages.
Final Written Decision, Before the Patent Trial and Appeal Board of United States Patent and Trademark Office, Case IPR2015-00108, U.S. Pat. No. 8,566,361 82, May 11, 2016, 57 Pages.
Final Written Decision, Before the Patent Trial and Appeal Board of United States Patent and Trademark Office, Case IPR2015-00128, U.S. Pat. No. 8,468,174 B1, Apr. 27, 2016, 74 Pages, Paper 61.
Final Written Decision, Before the Patent Trial and Appeal Board of United States Patent and Trademark Office, Case IPR2015-00128, U.S. Pat. No. 8,468,174 B1, Apr. 27, 2016, 74 Pages, Paper 8.
Gmane, Discussion regarding "File level snapshots in ZFS," From the zfs-discuss@opensolaris.org mailing list, Mar. 30, 2007, 1 Page, Can be retrieved at <URL:http://article.gmane.org/gmane.os.solaris.openolaris.zfs/7759/match=snapshot>.
Gmane, Discussion regarding "ZFS Clone Promotion [PSARC/2006/303 Timeout: May 12, 2006]," From the zfs-discuss@opensolaris.org mailing list, May 10, 2006, 1 Page, Can be retrieved at <URL:http://article.gmane.org/gmane.os.solaris.opensolaris.zfs/224/match=cloning>.
Gmane, Discussion regarding "ZFS Clone Promotion [PSARC/2006/303 Timeout: May 12, 2006]," From the zfs-discuss@opensolaris.org mailing list, May 10, 2006, 1 Page, Can be retrieved at <URL:http://article.gmane.org/gmane.os.solaris.opensolaris.zfs/229/match=zfs+clone+promotion>.
Gmane, Discussion regarding "ZFS Clone Promotion [PSARC/2006/303 Timeout: May 12, 2006]," From the zfs-discuss@opensolaris.org mailing list, May 9, 2006, 2 Pages, Can be retrieved at <URL:http://article.gmane.org/gmane.os.solaris.opensolaris.zfs/194/match=clone>.
Gmane, Discussion regarding "ZFS promotions," From the zfs-discuss©opensolaris.org mailing list, Dec. 12, 2008, 2 Pages, Can be retrieved at <URL:http://article.gmane.org/gmane.os.solaris.openolaris.zfs/22347/match=clone>.
Gmane, Discussion regarding "ZFS snapshot improvement," From the zfs-discuss@opensolaris.org mailing list, May 10, 2006, 1 Page, Can be retrieved at <URL:http://article.gmane.org/gmane.os.solaris.openolaris.zfs/232/match=snapshot>.
Higgins, B., et al., "Backup and Recovery Snap Manager for SQL Server," DLA Piper, Nov. 2008, 37 Pages.
Hitz, D., et al., "File System Design for an NFS File Server Appliance," Technical Report, USENIX, Winter 1994, 23 Pages.
IBM, "IBM System Storage SAN Volume Controller Software V4.3.0 introduces space-efficient VDisks and VDisk mirroring," IBM United States Announcement 208-114, May 13, 2008, 17 Pages.
Jackson, J., "ZFS: The future for storage networks?; File system has massive capacity, but licensing issues and architectural concerns persist," Government Computer News, Media, Inc., Jun. 25, 2007, 2 Pages.
Kakinoki, T., et al., "Query Language for Enterprise Data Integration in Saas Environment," Institute of Electronics, Information and

(56) References Cited

OTHER PUBLICATIONS

Communication Engineers, Data Engineering Workshop Collected Papers No. 19, (DEWS 2008 C3-1 ), Japan, The Institute of Electronics, Information and Communication Engineers, Data Engineering Research Committee, Apr. 7, 2008, 4 Pages. (With English Abstract).
Kay, D., "Working with ZFS Snapshots," Solaris 10 How-To Guides, Version 1.0, Sun Microsystems, Inc., Jan. 5, 2009, 8 Pages.
Kilvansky, M., "A Thorough Introduction to FlexClone Volumes," NetApp, Technical White Paper, Oct. 2004, 35 Pages.
Lal, J., et al., "DB2: Cloning a Database using NetApp FlexClone Technology," NetApp, Apr. 30, 2006, 60 Pages.
Merrill, J., et al., "SnapVault Best Pratices Guide," NetApp Technical Report, 2008, 29 Pages.
Microsoft, Microsoft Developer's Network, "Pages and Extents," Microsoft Corporation ("Pages and Extents") Sep. 2007, 2 Pages.
Mullins, "Excerpts of DB2 Developer's Guide, Fifth Ed." May 2004, 5 Pages.
Nadgir, N., "Databases and ZFS," Oracle Blog, Sep. 25, 2006, 8 Pages, Can be retrieved from <URL:https://blog.oracle.com/realneel/entry/zfs_and_databases>.
NetApp, "Datasheet FlexClone," NetApp Technical Doc, 2008, 2 Pages.
NetApp, "Datasheet FlexVol™ and FlexClone™ Software," NetApp Technical Doc, 2004, 2 Pages.
NetApp, "Datasheet Netapp SnapManager for Oracle," NetApp Technical Doc, 2008, 2 Pages.
NetApp, "Datasheet NetApp SnapMirror," NetApp Technical Doc, 2008, 2 Pages.
NetApp, "Datasheet NetApp Snapshot Technology," NetApp Technical Doc, 2004, 1 Page.
NetApp, 2007 NetApp, Inc., Data ONTAP 7.1 Data Protection Online Backup and Recovery Guide, NetApp Technical Doc, Jan. 12, 2007, pp. 508.
Network Appliance, Inc., "Data ONTAP 7.2 Commands: Manual Page Reference, vol. 1," May 16, 2008, 615 Pages.
Network Appliance, Inc., "Flexvol and Flexclone Software," 2006, 2 Pages.
Network Appliance, Inc., "NetApp Data Management for Decision Support Systems," 2005-2010, 4 Pages.
Network Appliance, Inc., "Network Appliance Snapmirror Software," 2006, 2 Pages.
Network Appliance, Inc., "SnapManager 2.2 for Oracle Installation and Administration Guide," Nov. 2007, 310 Pages.
Network Appliance, Inc., "SnapManager 3.0 for Oracle Installation and Administration Guide," Nov. 2008, 294 Pages.
Network Appliance, Inc., "SnapManager 5.0 for Microsoft SQL Server Installation and Administration Guide," Oct. 2008, 492 Pages.
Notice of Grounds for Rejection for Japanese Patent Application No. P2014-155597, dated Apr. 21, 2015, 5 Pages.
Oracle, "Oracle Database 12c: Full Transportable Export/Import," An Oracle White Paper, Jan. 2014, 13 Pages.
Oracle, "Oracle Database Administrator's Guide," 11g Release 2 (11.2), Feb. 2010, 1008 Pages.
Oracle, "Oracle Database Backup and Recovery User's Guide," 11g Release 1(11.1), Aug. 2008, 598 Pages.
Oracle, "Platform Migration using Transportable Tablespaces: Oracle Database 10g Release 2," Oracle Maximum Availability Architecture White Paper, Apr. 2007, 33 Pages.
Osuna, A., "An Introduction to FlexClone Volumes" Redbooks, IBM, 2006, 50 Pages.
Osuna, A., "Data Protection Strategies in IBM System Storage N Series" Redbooks, IBM, Jun. 2008, 90 Pages.
Osuna, A., "IBM System Storage N Series SnapMirror" Redbooks, IBM, Jul. 2006, 124 Pages.
Osuna, A., "IBM System Storage N Series SnapVault Best Practices Guide" Redbooks, IBM, 2007, 54 Pages.
Osuna, A., "Using IBM DB2 UDB with IBM System Storage N series" Redbooks, IBM, Dec. 2006, 136 Pages.

Patel, D., et al., "Rapid Database Development and Deployment," NetApp White Paper, Mar. 2007, 11 Pages.
Patterson, H., et al., "SnapMirror: File System Based Asynchronous Mirroring for Disaster Recovery," USENIX Association, Proceedings of the FAST 2002 Conference on File and Storage Technologies, Jan. 28-30, 2002, 14 Pages.
PCT International Search Report and Written Opinion for PCT/US2016/021573, dated May 23, 2016, 18 Pages.
Petition for Inter Partes Review of U.S. Pat. No. 8,150,808, Oct. 3, 2014, 61 Pages.
Petition for Inter Partes Review of U.S. Pat. No. 8,150,808, Oct. 3, 2014, 65 Pages.
Petition for Inter Partes Review of U.S. Pat. No. 8,150,808, Oct. 7, 2014, 65 Pages.
Petition for Inter Partes Review of U.S. Pat. No. 8,161,077, Oct. 6, 2014, 62 Pages.
Petition for Inter Partes Review of U.S. Pat. No. 8,161,077, Oct. 6, 2014, 65 Pages.
Petition for Inter Partes Review of U.S. Pat. No. 8,468,174, Oct. 23, 2014, 64 Pages.
Petition for Inter Partes Review of U.S. Pat. No. 8,548,944, Oct. 8, 2014, 65 Pages.
Petition for Inter Partes Review of U.S. Pat. No. 8,548,944, Oct. 8, 2014, 66 Pages.
Petition for Inter Partes Review of U.S. Pat. No. 8,566,361, Oct. 21, 2014, 66 Pages.
Ranganathan, A., and Neto, A., "Technical Report, SnapManager 3.0 for Oracle Best Practices, TR-3761" Apr. 2009, 88 Pages.
Sadagopan, P., et al., "Oracle Fusion Middleware DR Solution Using NetApp Storage," NetApp Technical Report, May 2008, 38 Pages.
Schuettinger, S., "Helping DBAs Become More Efficient NetApp Efficiency and Manageability Advantages," NetApp White Paper, Jul. 2009, 12 Pages.
Schuettinger, S., "NetApp Technical Report—Rapid Deployment of Oracle Database 11g Using VMWare Infrastructure and NetApp Flexclone," NetApp, Jan. 2008, 24 Pages.
Sun Microsystems, Inc., "ZFS the File System of the Future," Apr. 27, 2009, 19 Pages.
Sun Microsystems, Inc., "Solaris ZFS Administration Guide," Aug. 2006, 164 Pages.
Sun Microsystems, Inc., "Solaris ZFS Administration Guide," Mar. 2009, 292 Pages.
Sun Microsystems, Inc., "System Administration Guide: Virtualization Using the Solaris Operating System," Oct. 2009, 562 Pages.
Syncsort Incorporated, "Near-Instant Oracle Cloning with Syncsort AdvancedClient Technologies," Synscort, White Paper, 2007, 12 Pages.
Syncsort Incorporated, "Syncsort Backup Express Advanced Recovery for NetApp," Synscort, 2008, 12 Pages.
Tate, J., et al., "Implementing the IBM System Storage SAN Volume Controller V4.3," IBM Redbook SG24-6423-06, Oct. 2008, 970 Pages.
ViSolve, "Cross Platform Transportable Tablespaces Migration in Oracle 1g," ViSolve Migration Team, Jun. 2012, 13 Pages.
VMware, Inc. and EMC Corporation, "Accelerate Oracle Database log Creation and Deployment Using VMware Infrastructure and EMC Celerra Writeable Checkpoints," Mar. 2008, 16 Pages.
VMware, Inc. and IBM "Using IBM® TotalStorage® Enterprise Storage Server® FlashCopy® Function with the VMware ESX 2.5 Server ("ESX IBM")," Sep. 1, 2005, 25 Pages.
VMware, Inc., "Using Clones to Streamline Development ("Ws5 Clones")," 2005, 9 Pages.
VMware, Inc., "Using VMware Infrastructure for Backup and Restore ("Esx3")," 2006, 20 Pages.
VMware, Inc., "Workstation 5 User's Manual ("WS5 Manual")," 2006, 492 Pages.
Watanabe, S., "Solaris 10 ZFS Essentials," Sun Microsystems, 2010, 146 Pages.
Wikipedia, "ZFS," Last Modified Jul. 22, 2014, 14 Pages.
"ZFS Snapshot and Amazon S3 (Part 2 of 2)," Paul's Blog 3.0 (Release Candidate), Oracle, 2007, 5 Pages.

(56) References Cited

OTHER PUBLICATIONS

United States Office Action, U.S. Appl. No. 14/657,708, dated May 18, 2017, 43 pages.

VIRTUAL PARTITIONS IN VIRTUAL DATABASES

CROSS REFERENCES TO RELATED APPLICATIONS

This application is a continuation of U.S. application Ser. No. 14/657,708, filed on Mar. 13, 2015, which is incorporated by reference in its entirety.

BACKGROUND

This invention relates generally to virtual databases, and in particular to managing data stored in virtual partitions in a virtual database independent of the remaining data of the virtual database.

Databases store data that is critical to an organization and thus form an important part of an organization's information technology infrastructure. As the information available in an organization grows, so does the complexity of the infrastructure required to manage the databases that store the information. The increased complexity of the infrastructure increases the resources required to manage the databases and the applications that depend on the databases. These increased costs may include the costs associated with hardware for managing the databases as well as the costs associated with additional personnel needed to maintain the hardware.

Maintaining an instance of a database is associated with expenses for the organization. Therefore, organizations avoid maintaining a large number of instances of databases if possible. Vendors of database software often charge license fees per instance of databases used. Therefore, an organization typically has to pay higher license fees for maintaining more instances of databases. Furthermore, the organization may have to use additional hardware and software resources to manage the database instances. Also, having a large number of instances of databases requires more IT (information technology) resources/personnel to manage the databases. Therefore, enterprises prefer to use an instance of database for multiple purposes if possible, for example, for storing data of multiple applications.

However, using the same instance of database for multiple purposes has other disadvantages. Maintenance of an instance of a database typically depends on the applications using the database. For example, if the data stored by application becomes corrupted, a previous consistent state of the database needs to be restored. However, if multiple applications use the same instance of the database, the state of the remaining applications may be affected by the restore operation. As a result, the data of applications that are functioning properly may also get restored to a previous state. Accordingly, maintaining multiple applications on a single database has its own challenges. Conventional techniques for maintaining databases are often inadequate for managing storage of data of multiple applications on the same instance of database.

SUMMARY

To address the needs unmet by existing database technologies, embodiments of the invention enable virtual databases that allow efficient management of data from multiple source databases. A database storage system stores snapshots representing various points in time of the data of multiple source databases. The database storage system creates a virtual database that stores database blocks that are shared by one or more other virtual databases. The database storage system imports a first virtual partition from a first source database and a second virtual partition from a second database into the virtual database. The first virtual partition represents data of a set of tables from the first source database at a first point in time and the second virtual partition represents data of a set of tables from the second source database at a second point in time. Each virtual partition shares database blocks with virtual partitions of other virtual databases. The database storage system allows modification of the state of each virtual partition independent of the other partition. For example, the database storage system may update the state of the first virtual partition to correspond to a recent point in time compared to the first point in time or to an older point in time compared to the first point in time. The database storage system updates the state of the first virtual partition independent of the state of the second partition. Furthermore, the state of each virtual partition is updated independent of the state of the database blocks of the virtual database.

In an embodiment, importing a partition representing state of a source database corresponding to a point in time into a virtual database comprises the following steps. The database storage system creates a staging virtual database based on a snapshot stored in the database storage system. In an embodiment, the database storage system uses a snapshot that represents the most recent state of the source database captured before the point in time. The database storage system updates the database blocks of the snapshot if necessary using transaction logs obtained from the source database such that the updated database blocks represent the state of the source database at the point in time. The database storage system validates the partition using the staging virtual database. The database storage system validates the partition by checking if the database tables of the partition refer to database tables outside the partition, for example, using foreign keys. If the database tables of the partition do not refer to any database tables outside the partition, the database storage system determines that the partition is a valid partition. The database storage system imports metadata describing the partition from the staging virtual database to the virtual database. The database storage system modifies the files of the virtual database to point to database blocks of the partition from the staging virtual database.

In an embodiment, the database storage system imports multiple versions of a partition of a source database in a virtual database. For example, the database storage system may import a first version of a partition of a source database corresponding to a first point in time as a first virtual partition and subsequently import a second version of the same partition of the source database corresponding to a second point in time as a second virtual partition. The first virtual partition shares one or more database blocks with the second virtual partition.

Sharing of database blocks across multiple versions of the partition in a virtual database allows querying data of the same set of tables across different points in time. For example, a virtual database system accessing the virtual database may execute a database query that combines (e.g., aggregates) data of a table corresponding to a point in time with data of the same table corresponding to a different point in time. Similarly, a virtual database system accessing the virtual database may execute a database query may execute a database query that compares data of a table corresponding to a point in time with data of the same table corresponding to a different point in time The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Virtual Databases

Storage systems store multiple point-in-time copies of a source database using snapshots. Sharing of data blocks across snapshots allows efficient storage of multiple point-in-time copies of the source database. Virtual databases corresponding to points in time of the source database are provisioned using the storage system. A virtual database is also referred to herein as a VDB. Virtual database systems are described in U.S. patent application Ser. No. 12/603,541 filed on Oct. 21, 2009, now issued as U.S. Pat. No. 8,150,808, which is incorporated by reference herein in its entirety. Storage systems may be used for other purposes, for example, for storing point in time copies of file systems for purposes of taking backups of file systems. Backup systems based on stored snapshots of data are described in U.S. patent application Ser. No. 13/183,131 filed on Jul. 14, 2011, now issued as U.S. Pat. No. 8,548,944, which is incorporated by reference herein in its entirety.

A virtual database created for a point in time is stored as a set of files that contain the information of the database as available at that point in time. Each file includes a set of database blocks and the data structures for referring to the database blocks. A virtual database may be created on a database server by creating the database files for the source database corresponding to the state of the source database at a previous point in time, as required for the database server.

The files of the virtual database are made available to the database server using a file sharing mechanism, which links the virtual database to the appropriate database blocks stored on the storage system. The process of making the virtual database available to a database server is called "provisioning" the virtual database. Multiple virtual databases can be provisioned based on the state of the source database at the same point in time.

Figure 1:
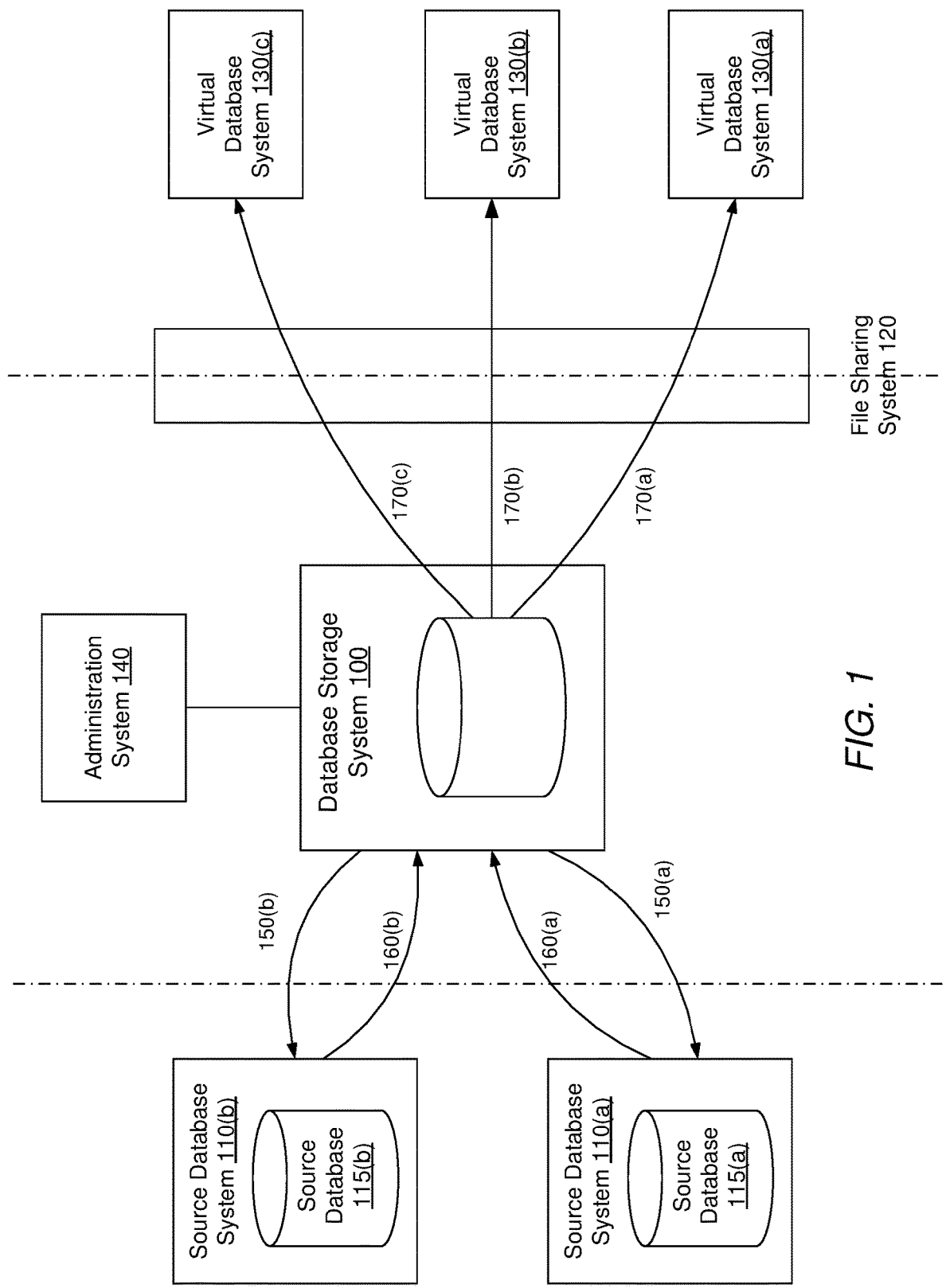
FIG. 1 is a diagram illustrating copying of information from a source database to a storage system for provisioning as virtual databases, according to an embodiment of the invention.

FIG. 1 is a diagram illustrating copying of information from a source database to a storage system for provisioning as virtual databases, according to an embodiment of the invention. The source database systems 110 manage data for an organization. The storage system 100 retrieves data associated with source databases 115 stored in one or more source database systems 110 and stores the data in an efficient manner by sharing database blocks across stored point-in-time copies of each source database. A database administrator user interface allows a database administrator to perform various actions supported by the storage system 100.

In response to a request from the administration system 140, or based on a predefined schedule, the storage system 100 sends a request 150 for data to a source database system 110. The source database system 110 responds by sending information stored in the source database 115 as a stream of data 160. The request 150 is sent periodically and the source database system 110 responds by sending information representing changes of data stored in the source database since the last response 160 sent by the source database system 110. The storage system 100 receives the data 160 sent by the source database system 110 and stores the data. The storage system 100 stores the information efficiently, for example, by storing versions of database blocks that have changed and reusing (sharing) database blocks that have not changed across point-in-time copies.

To create a virtual database, the storage system 100 creates files that represent the information corresponding to the source database system 110 at a given point in time. The storage system 100 exposes 170 the corresponding files to a virtual database system 130 using a file sharing system 120. The virtual database system 130 runs a database server that uses the files exposed 170 by the storage system 100 as a virtual database. Hence, a virtual copy of the source database is created for the virtual database system 130 for a given point in time in a storage efficient manner.

A database block may be shared between different files, each file associated with a different virtual database. In particular, a database block is shared if the corresponding virtual database systems 130 are only reading the information in the database block and not writing to the database block. In one embodiment, the virtual database manager 330 makes copies of the database blocks if necessary, in a lazy fashion. For example, a particular database block may be shared by multiple virtual databases that read from the same database block. But if one of virtual database systems 130 attempts to write to the database block, a separate copy of the database block is made because the writing operation causes that database block to be different for the virtual database corresponding to that virtual database systems 130 than it is for the other virtual databases.

System Architecture

Figure 2:
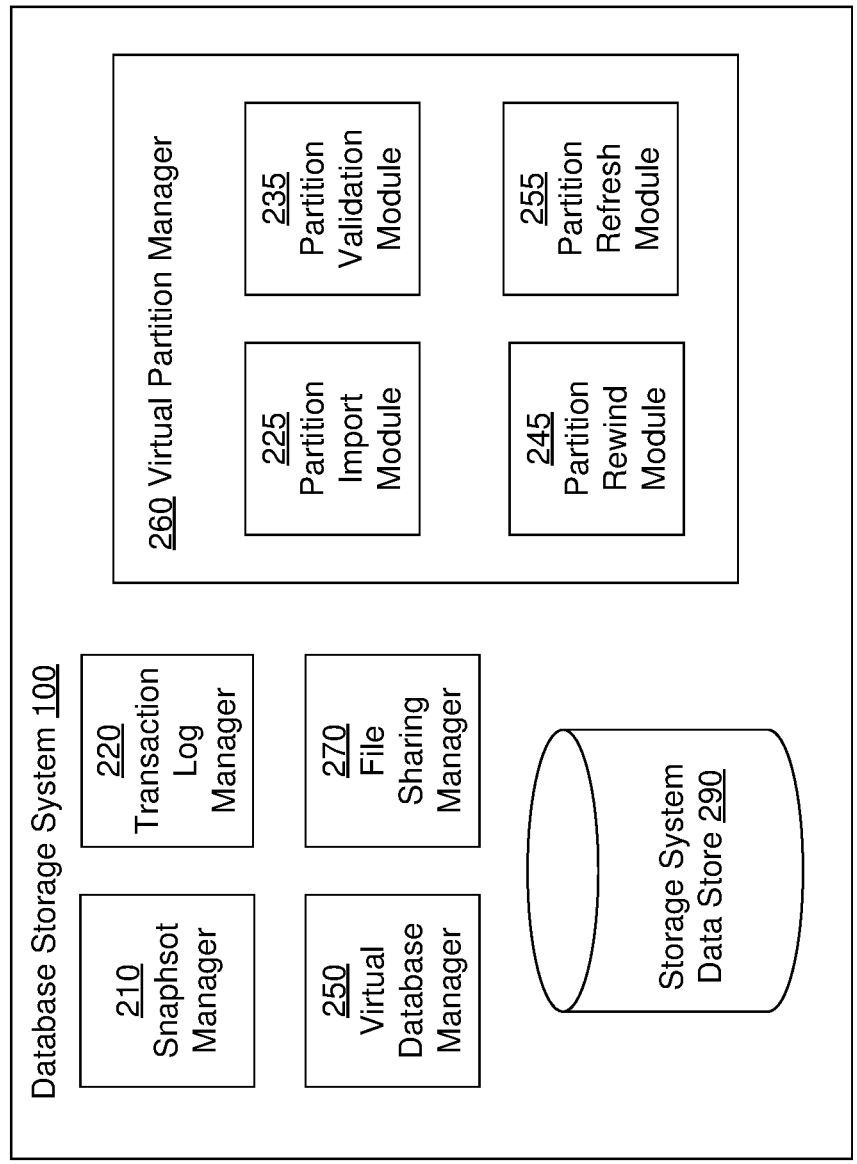
FIG. 2 is a schematic diagram of the architecture of a system for maintaining virtual partitions in virtual databases, in accordance with an embodiment of the invention.

FIG. 2 is a schematic diagram of the architecture of a system for maintaining virtual partitions in virtual databases, in accordance with an embodiment of the invention. The database storage system 100 retrieves information stored in the source database system 110 and stores it. The information retrieved includes database blocks storing data of the source database 115, transaction logs, metadata information related to the database, configuration files associated with the source databases, information related to users of the database and the like.

The data stored in the storage system data store 290 is exposed to a virtual database system 130 allowing the virtual database system 130 to treat the data as a copy of the source database 115 stored in the source database system 110. The database storage system 100 includes a snapshot manager 210, a transaction log manager 220, a file sharing manager 270, a virtual database manager 250, a virtual partition manager 260, and a storage system data store 290. In alternative configurations, different and/or additional modules can be included in the database storage system 100.

The snapshot manager 210 interacts with the source database system 110 by sending a request to the source database system 110 to retrieve information representing a point-in-time copy of a source database 115. The snapshot manager 210 stores the data obtained from the source database system 110 in the storage system data store 290 as a snapshot. The data retrieved by the snapshot manager 210 corresponds to database blocks (or pages) of the database being copied from the production DB data store 350. After a first request to retrieve information of production DB data store 350, a subsequent request retrieves only the data that changed in the database since the previous request. The database storage system 100 combines data collected in the first request with the data collected in a second request to reconstruct a copy of the source database 115 corresponding to a point in time at which the data was retrieved from the production DB data store 350 for the second request.

The transaction log manager 220 sends request to the source database system 110 for retrieving portions of the transaction logs stored in the source database system 110. In some embodiments, the request from the transaction log manager 220 is sent to the vendor interface module 335. The data obtained by the transaction log manager 220 from the vendor interface module 335 is stored in the storage system data store 290. In one embodiment, a request for transaction logs retrieves only the changes in the transaction logs in the source database system 110 since a previous request for the transaction logs was processed. The database blocks retrieved by a point in time copy manager 210 combined with the transaction logs retrieved by the transaction log manager 220 can be used to reconstruct a copy of a database in the production system 110 corresponding to times in the past in between the times as which point-in-time copies are made.

The file sharing manager 270 allows files stored in the storage system data store 290 to be shared across computers that may be connected with the database storage system 100 over the network. The file sharing manager 270 uses the file sharing system 120 for sharing files. An example of a system for sharing files is a network file system (NFS). Sharing a file stored in the storage system data store 290 using the file sharing manager 270 allows a remote computer, for example, the virtual database systems 130 to access the data in the shared file. A remote system may be able to read and write from/to the file shared by the storage system data store 290.

The virtual database manager 250 receives requests for creation of a virtual database for a virtual database system 130. The request for creation of a virtual database may be sent by a database administrator using the administration system 140 and identifies a source database system 110, a virtual database system 130, and includes a past point-in-time corresponding to which a virtual database needs to be created. The virtual database manager 250 creates the necessary files corresponding to the virtual database being created and shares the files with the virtual database system 130. The database administrator for a virtual database system 130 may be different from a database administrator for the source database system 110.

The virtual partition manager 260 manages various operations related to virtual partitions including managing state of the virtual partitions, for example, by performing refresh and rewind operations associated with partitions which are further described herein. The virtual partition manager 260 further comprises a partition import module 225, a partition validation module 235, a partition rewind module 245, and a partition refresh module 255. Other embodiments may include more or less modules. Functions implemented in a module may be implemented by other modules.

The partition import module 225 imports the data of a partition from a source database to a virtual database. The source database may be a virtual database that shares database blocks with other virtual databases or it may be a conventional database (that does not share database blocks with other databases.) For example, the partition import module 225 may import a partition of a source database 115 to a virtual database. As another example, the partition import module 225 may import a partition of another virtual database to a virtual database. The partition import module 225 invokes the partition validation module 234 to validate the partition being imported.

The partition validation module 235 validates a partition to make sure that the partition is self-contained, i.e., tables in the partition do not have foreign keys that reference tables outside the partition. The partition validation module 235 determines that a partition is valid if all foreign keys of tables in the partition refer to other tables within the partition. The partition validation module 235 determines that a partition is invalid if the partition includes at least one table that has a foreign key that refers to a table outside the partition. Since the database storage system 100 modifies the state of a virtual partition independent of the rest of the virtual database, if a table of the virtual partition includes a foreign key to another table outside of the virtual partition, the data of the table can become inconsistent with respect to the other table.

For example, assume that the database storage system 100 creates a virtual database corresponding to point in time t1. The virtual database includes a virtual partition that includes a table Tx having a foreign key to table Ty outside of the virtual partition. Assume that the table Tx is consistent with respect to the table Ty such that all references of the foreign key are valid. However, if the database storage system 100 modifies the state of the virtual partition to correspond to point-in-time t2, independent of the state of the rest of the virtual database, the data of the table Tx at point-in-time t2 may be different compared to the data of table Tx at point-in-time t1. More specifically the table Tx may include additional records at point-in-time t2 compared to the records of table Tx at point-in-time t1. If the table Tx includes new records that refer values that are missing in table Ty (which corresponds to point-in-time t1), table Tx will show inconsistencies when the database storage system 100 updates table Tx to correspond to point-in-time t2 while table Ty corresponds to point-in-time t1. This will happen even if tables Tx and Ty are consistent with respect to each other if the data of both Tx and Ty corresponded to point-in-time t2. Therefore, the partition validation module 235 declares a virtual partition invalid if the virtual partition includes foreign keys referring to tables outside the virtual partition.

The partition validation module 235 inspects metadata describing the tables included in the partition. In particular, the partition validation module 235 iterates through all tables having foreign keys to other tables (referred to as target tables). The partition validation module 235 checks if the target table referred to by the foreign key of a source table belongs to the partition or not. If the partition validation module 235 determines that the target table belongs to the partition, the partition validation module 235 continues checking other foreign key relationships. If the partition validation module 235 determines that the target table does not belong to the partition, the partition validation module 235 indicates that the partition is invalid and provides information describing one or more foreign key relationships that caused the partition to become invalid.

The partition refresh module 255 and the partition rewind modules 245 allow modification of the data of a virtual partition such that the database blocks of the virtual partition correspond to a different point in time (compared to its current point in time). The virtual partition refresh module 255 modifies the database blocks of a virtual partition to correspond to a more recent point in time compared to the current point in time of the partition. For example, the partition refresh module 255 may refresh the database blocks of the virtual partition to the latest point in time of the corresponding source database that is available in the storage system data store 290.

The partition rewind modules 245 modifies the database blocks of a partition to correspond to an older point in time compared to the current point in time of the partition. The virtual partition manager 260 updates metadata of the partition and modifies the file structures storing data of the partition to point at a different set of database blocks. The virtual partition manager 260 does not copy database blocks as a result of the refresh or rewind operation.

In an embodiment, the database storage system 100 maintains timeflows for a partition, each timeflow comprising representations of changes to the partition starting from an initial state of the partition. The representations of changes comprise snapshots of the partitions taken at different points in time and transaction logs corresponding to changes to the database tables of the partition. The database storage system receives a request to refresh or rewind the partition to a state of the partition identified by a timeflow of the partition and a target point in time of the timeflow. The database storage system refreshes or rewinds the partition by modifying the virtual database to refer to database blocks of a snapshot storing data of the partition associated with the identified timeflow. Methods and systems for performing refresh and rewind operations on virtual databases are described in U.S. patent application Ser. No. 14/324,485 filed on Jul. 7, 2014, which is incorporated by reference herein in its entirety.

Even if the virtual partition manager 260 modifies the metadata of a partition to point to database blocks corresponding to a different point in time compared to the current point in time of the partition, the virtual partition manager 260 may not change pointers to all database blocks of the partition. More specifically if the virtual partition manager 260 modifies the representation of the partition to change from the state at point-in-time T1 to the state at point-in-time T2, the two representations may share some database blocks, for example, the database blocks that do not change between the point-in-time T1 and the point-in-time T2. The virtual partition manager 260 modifies the representation of the partition so as to change the pointers of the file structure only for database blocks that changed between the point-in-time T1 and the point-in-time T2. The virtual partition manager 260 does not change the pointers of the file structure for database blocks that are shared between the stored representations of the source database corresponding to point-in-time T1 and point-in-time T2. Furthermore, the virtual partition manager 260 performs the refresh or rewind operation on a partition independent of the remaining data of the virtual database. For example, the data of database tables that are outside the partition being updated remains unchanged. For example, the virtual partition manager 260 may change the state of a partition P1 independent of another partition P2 of the virtual database.

Managing Data of a Virtual Partition

Figure 3:
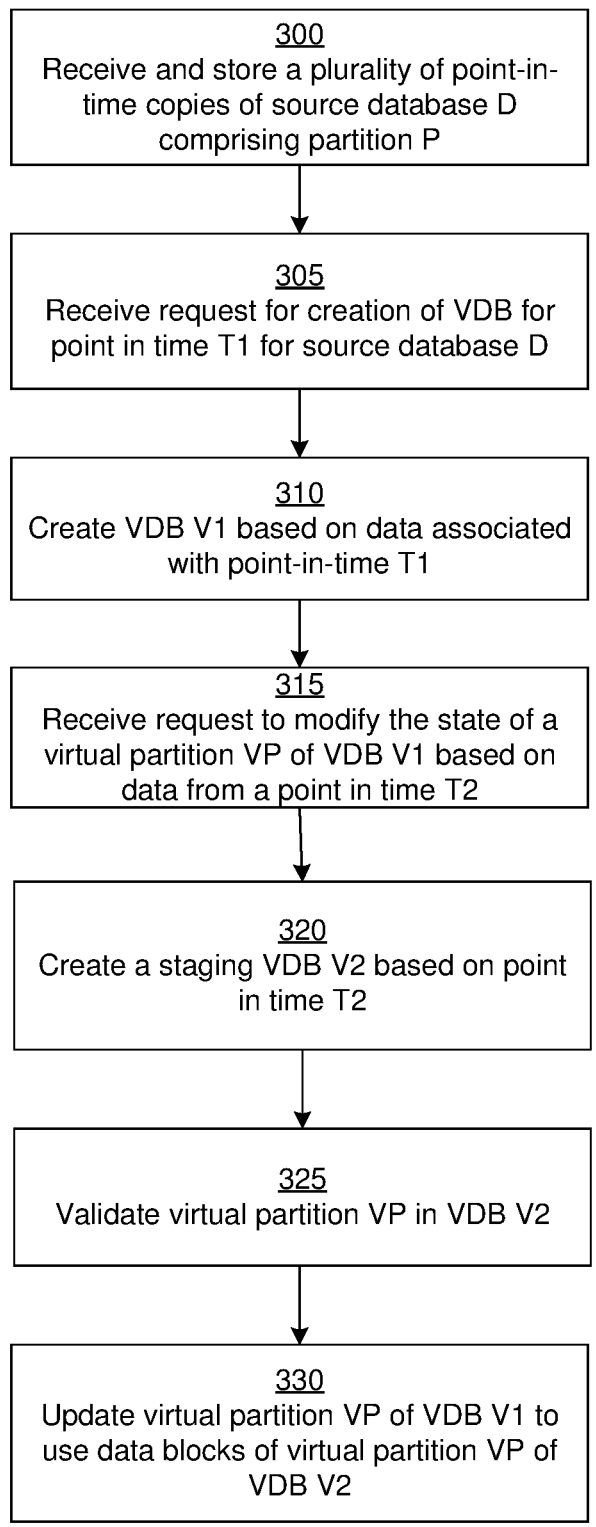
FIG. 3 is a flowchart of a process for maintaining data of a virtual partition independent of the remaining data of the virtual database, according to an embodiment.

FIG. 3 is a flowchart of a process for maintaining data of a virtual partition independent of the remaining data of the virtual database, according to an embodiment. Various steps shown in the flowchart may be executed in an order different from that indicated in the flowchart. For example, certain steps may be executed in parallel. Steps described herein may be executed by modules different from those indicated herein.

The database storage system 100 receives 300 and stores point-in-time copies of a source database (say source database D). The database storage system 100 stores the point-in-time copies in the storage system data store 290 (a stored point-in-time copy of a source database is also referred to as a snapshot.) A snapshot may share database blocks with other snapshots. The source database is assumed to include a partition P.

Each snapshot is associated with a point in time since the snapshot represents a state of the source database at that particular point in time. The time associated with a snapshot may be the time at which the source database provided the data for the snapshot. The time associated with the snapshot may be the time at which the database storage system 100 received the data for the snapshot. The time associated with the snapshot may be the time at which the snapshot was created. The various ways of determining the time associated with the same snapshot may differ in the exact value of the time due to network or processing delays. However, the various ways of determining the time associated with a snapshot all determine a state of the source database corresponding to the same point in time.

The virtual database manager 250 receives 305 a request to create a virtual database based on a point-in-time T1. The virtual database manager 250 creates 310 a virtual database V1 based on data associated with point-in-time T1. The virtual database manager 250 identifies the most recent snapshot S1 obtained before the time T1. If a snapshot S1 stored in the storage system data store 290 corresponds to the time T1, the virtual database manager 250 creates the virtual database V1 based on the snapshot S1. If the data of the source database D was updated since the snapshot S1 was obtained, the virtual database manager 250 applies transaction logs obtained from the source database D to the data of snapshot S1, to update the data to correspond to the state of the source database D at time T1.

The file sharing manager 270 shares the data of the virtual database created with a virtual database system 130, thereby allowing the virtual database system 130 to access the data by reading as well as writing to the virtual database. If the virtual database system 130 writes to a database block, the virtual database manager 250 makes a copy of the database block and allows the virtual database manager 250 to write to the copy of the database block.

The virtual partition manager 260 receives 315 a request to modify the state of a partition P of the virtual database V1 based on data from a point in time T2. The virtual partition manager 260 creates a staging virtual database based on data corresponding to point-in-time T2. The process of creation of staging virtual database V2 is similar to the process described above for creation of virtual database V1. The virtual partition manager 260 identifies a virtual partition VP corresponding to the partition P of the source database in the staging virtual database V2.

The virtual partition manager 260 validates the virtual partition in staging virtual database V2. The virtual partition manager 260 validates virtual partition VP by checking if any database table in the virtual partition VP of virtual database V2 has a foreign key relation to a table outside the virtual partition VP. If a database table refers to data outside the partition, the data of the partition cannot be modified independent of the rest of the virtual database.

For example, assume that a column of a table T1 in the virtual partition VP refers to rows of table T2 outside partition P (since T1 has a foreign key relationship to table T2). If the partition is updated to correspond to a more recent point-in-time, the table T1 may refer to data stored in the recent version of T2 (based on point in time T2) but not present in the version of table T2 that is based on point-in-time T1. Since the virtual partition manager 260 updates the data of the virtual partition without updating the rest of the virtual database, the updated table T1 of the virtual partition VP would refer to an older version of table T2. Accordingly, the database would indicate that foreign key relationship between T1 and T2 is broken by sending error messages. Furthermore, operations based on table T1 may also fail due to the broken foreign key relationship.

If the virtual partition manager 260 determines that the virtual partition VP in the staging virtual database V1 is invalid, the virtual partition manager 260 returns error and does not proceed with the step of updating the partition. If the virtual partition manager 260 determines that the virtual partition VP in the staging virtual database V1 is valid, the virtual partition manager 260 proceeds with updating the state of the partition. The virtual partition manager 260 updates 330 the virtual partition VP of virtual database V1 to use the database blocks of the virtual partition VP of the staging virtual database V2. If the point-in-time T2 is more recent compared to the point-in-time T1, the update 330 operation is performed by the partition refresh module 255 as a refresh operation. If the point-in-time T1 is more recent compared to the point-in-time T2, the update 330 operation is performed by the partition rewind module 245 as a rewind operation.

Figure 4:
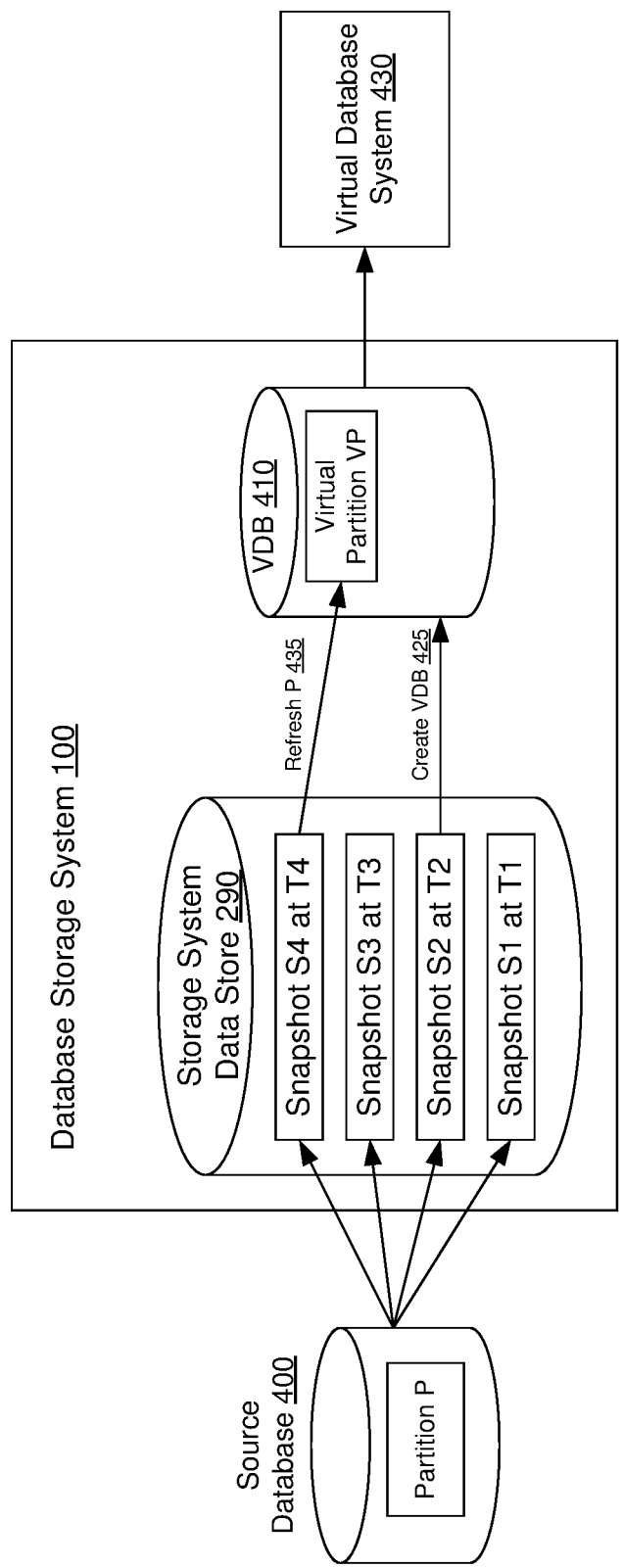
FIG. 4 illustrates modifying the state of a virtual partition of a virtual database independent of the remaining data of the virtual database, according to an embodiment of the invention.

FIG. 4 illustrates modifying the state of a virtual partition of a virtual database independent of the remaining data of the virtual database, according to an embodiment of the invention. As shown in FIG. 4, a source database 400 includes a partition P comprising a set of database tables that do not have any foreign key relationship that points to a table outside the partition P. The database storage system 100 receives and stores multiple point-in-time copies of the source database. As shown in FIG. 4, the database storage system 100 stores at least four point-in-time copies or snapshots S1, S2, S3, and S4 of the source database representing data of the source database at points in time T1, T2, T3, and T4 respectively. Assume that the point in time T4 occurs after point in time T3, which in turn occurs after point in time T2, which in turn occurs after point in time T1. The various point-in-time copies may share database blocks. Accordingly, if a database block is not changed between two point-in-time copies, the two point-in-time copies may share that database block.

As shown in FIG. 4, the database storage system 100 creates 425 a virtual database 410 based on snapshot S2 representing data of the source database at time T2. The virtual database 410 includes a virtual partition VP corresponding to the partition P of the source database. Accordingly, all data of the virtual database 410, when the virtual database 410 is created corresponds to the snapshot S2. The database storage system 100 provides access to the virtual database to the virtual database system 430.

The database storage system 100 further modifies the files storing the virtual database 410, such that the data of the virtual partition VP refers to the snapshot S4 representing data of the source database at time T4. However, the remaining data of the virtual database 410 is based on snapshot S2 and represents the state of the source database at time T2. In other words, the virtual database 410 includes a portion of the data based on snapshot S4 and another portion of the data based on snapshot S2. Therefore, embodiments of the invention allow virtual databases to store data from a plurality of points-in-time copies (snapshots) of a source database.

FIG. 4 shows that the virtual partition VP (corresponding to partition P of the source database) is based on a snapshot representing more recent data of the source database compared to the rest of the virtual database. However, the virtual partition VP can also be modified to point to a snapshot representing older data of the source database compared to the rest of the virtual database. For example, the virtual partition VP can be modified to use data of the snapshot S1 representing state of the source database at time T1 which occurs before time T2.

A virtual database can include multiple virtual partitions that are independent of each other. The database storage system 100 can modify each virtual partition to use a different snapshot of the source database stored on the database storage system 100. The snapshot used for a virtual partition may be more recent compared to the snapshot used to create the virtual database or it may be older snapshot.

Figure 5:
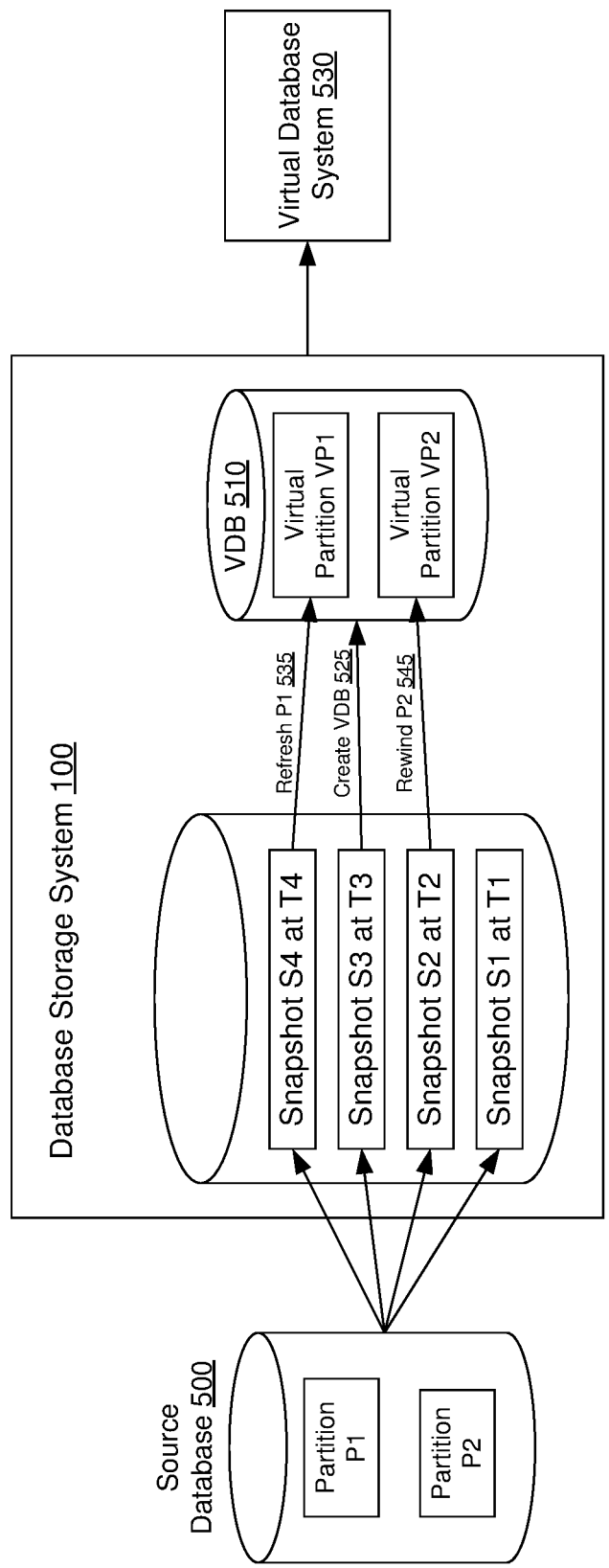
FIG. 5 illustrates storing multiple virtual partitions in a virtual database and modifying the state of each virtual partition independent of the other virtual partitions, according to an embodiment of the invention.

FIG. 5 illustrates storing multiple virtual partitions in a virtual database and modifying the state of each virtual partition independent of the other virtual partitions, according to an embodiment of the invention. Similar to FIG. 4, the database storage system shown in FIG. 5 stores at least four snapshots S1, S2, S3, and S4 of the source database representing data of the source database at points in time T1, T2, T3, and T4 respectively. The source database system 510 includes two partitions P1 and P2 that are independent of each other. In other words, P1 comprises a set of database tables that is distinct from the set of tables corresponding to P2.

The database storage system 100 receives a request to create a virtual database based on the snapshot S3. The database storage system 100 creates 525 a virtual database 510 based on the snapshot S3. The database storage system 100 provides access to the virtual database 510 to the virtual database system 530. The virtual database 510 includes two virtual partitions VP1 and VP2 corresponding to partitions P1 and P2 respectively of the source database. The virtual partitions VP1 and VP2 of virtual database 510 can share database blocks with the corresponding virtual partitions (i.e., VP1 and VP2 respectively) of other virtual databases created based on source database 500 (for example, virtual databases created based on snapshots of source database 500 other than S3 or even other virtual databases created based on snapshot S3.)

The database storage system 100 can modify the state of the virtual partitions to correspond to snapshots different from the snapshot used to create the virtual database (i.e., snapshot S3 in example illustrated in FIG. 5.) Furthermore, the database storage system 100 can modify the state of each virtual partition independent of the other virtual partitions.

The database storage system 100 receives a request to modify the state of virtual partition VP1 to correspond to snapshot S4 that is more recent compared to the snapshot S3 used to create the virtual database 510. The database storage system 100 refreshes 535 the state of the virtual partition VP1 such that the virtual partition VP1 points at database blocks of the snapshot S4. The database blocks of snapshot S3 and S4 may overlap. Accordingly, even though the virtual partitions corresponds to snapshot S4, several database blocks that the virtual partition points at may be identical to database blocks that the virtual partition VP1 pointed at before the refresh operation (i.e., when the VP1 corresponded to snapshot S3.)

The database storage 100 also receives a request to modify the state of virtual partition VP2 to correspond to snapshot S2 that is older than the snapshot S3 used to create the virtual database 510. The database storage system 100 rewinds 545 the state of the virtual partition VP2 such that the virtual partition VP2 points at database blocks of the snapshot S2. The database blocks of snapshot S3 and S2 may overlap. Accordingly, even though the virtual partition VP2 corresponds to snapshot S2, several database blocks that the virtual partition points at may be identical to database blocks that the virtual partition VP2 pointed at before the rewind operation (i.e., when the virtual partition VP2 corresponded to snapshot S3.)

Therefore, the database storage system 100 can modify virtual partitions of a virtual database such that each virtual partition corresponds to a different snapshot. Furthermore, the various partitions may correspond to snapshots different from the snapshot used to create the virtual database. Each virtual partition can share database blocks with virtual partitions of other virtual databases. More specifically, each virtual partition can share database blocks with the same virtual partition of other virtual databases. The order in which the operations 535 and 545 are performed can be different from that described herein. Either the operation 535 may be performed before operation 545 or the operation 535 can be performed after operation 545.

In an embodiment, the database storage system 100 can create a plurality of virtual databases, each based on different snapshots of a source database, and each including a virtual partition. The virtual partition of each of the plurality of virtual databases can be based on the same snapshot, even though each virtual database is based on a different snapshot. Accordingly, the virtual partition of two distinct virtual databases may share all (or some) of the database blocks.

Figure 6:
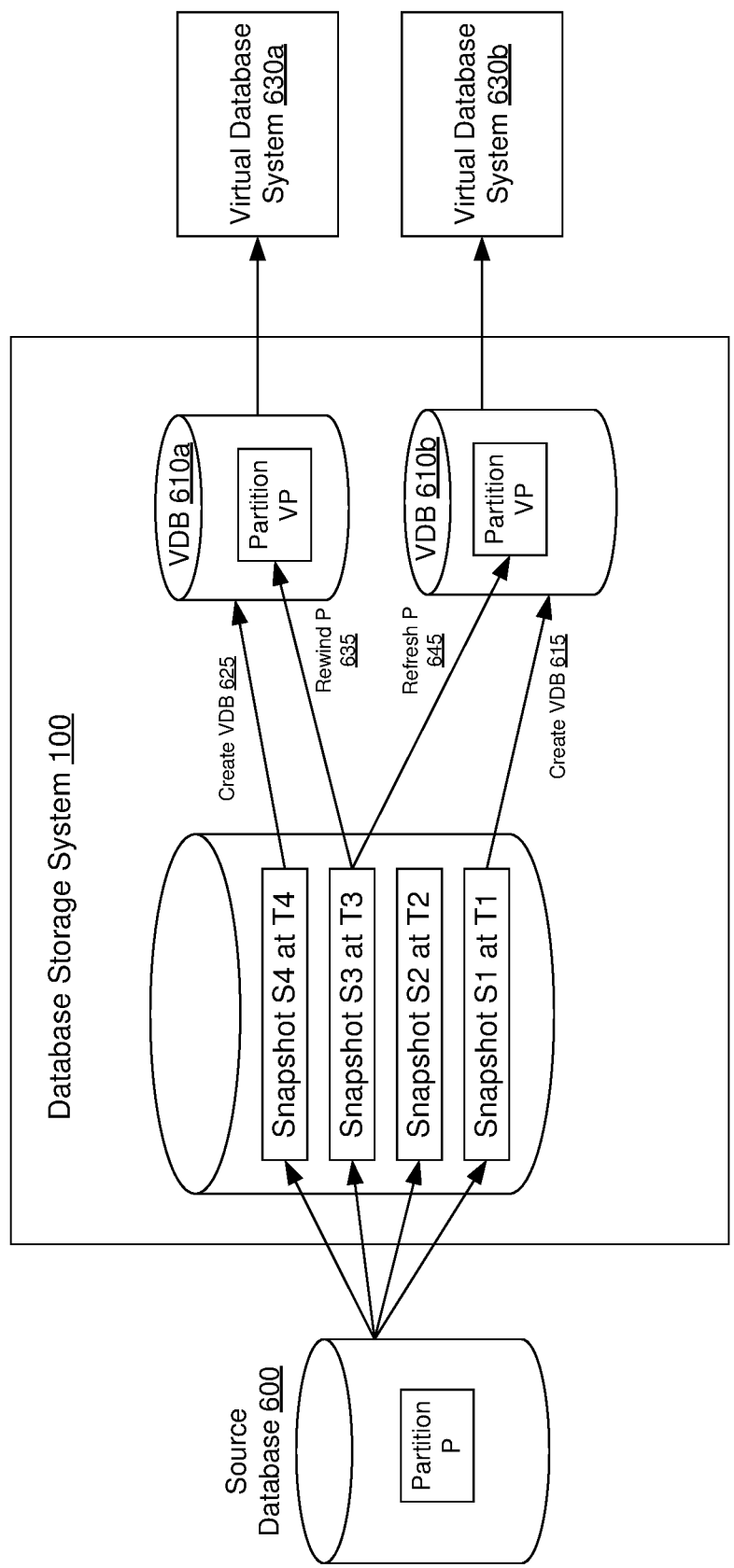
FIG. 6 illustrates sharing of data across virtual partitions created for different virtual databases, according to an embodiment of the invention.

FIG. 6 illustrates sharing of data across virtual partitions created for different virtual databases, according to an embodiment of the invention. Similar to FIG. 4 and FIG. 5, the database storage system 100 shown in FIG. 6 stores snapshots S1, S2, S3, and S4 of source database 600. The source database 600 includes a partition P. The database storage system 100 creates two virtual databases 610a and 610b in response to requests to create virtual databases. The virtual database 610a is accessed by virtual database system 630a and the virtual database 610b is accessed by virtual database system 630b. The virtual database 610a is created using snapshot S4 and the virtual database 610b is created using snapshot S1.

The database storage system 100 further receives a request to refresh the data of the virtual partition VP of virtual database 610b to use the data of snapshot S3. Accordingly, the database storage system 100 refreshes 645 the data of the virtual partition VP of virtual database 610b to use the data of snapshot S3. Furthermore, subsequent to the creation of the virtual database 610a, the database storage system 100 receives a request to rewind the data of the virtual partition VP of virtual database 610a to use the data of snapshot S3. Accordingly, the database storage system 100 rewinds 635 the data of the virtual partition VP of virtual database 610a to use the data of snapshot S3.

FIG. 6 illustrated that the database storage system 100 can create a first virtual database based on a first snapshot of a source database and a second virtual database based on a second snapshot of the same source database, each virtual database storing a virtual partition corresponding to a partition of the source database. The database storage system 100 can modify the virtual partition of each virtual database to correspond to a third snapshot. Accordingly, the two virtual partitions point to the same set of database blocks. If either of the virtual databases receives a request to write to a database table of the virtual partition, a copy of the database block being written to is created. However, the remaining database blocks may continue to be shared until they are modified.

The virtual partitions of the two virtual databases may point at different snapshots. For example, the virtual partition of the first virtual database may point at a third snapshot and the virtual partition of the second virtual database may point at a fourth snapshot. However, the two virtual partitions may still share one or more database blocks, for example, database blocks that never got updated between the third and the fourth snapshots.

In an embodiment, each partition is associated with a schedule for updating the data of the partition. For example, the database storage system 100 may receive and store information describing a schedule for refreshing the data of the partition. The refreshing of the data of the partition causes the data to be updated to correspond to a more recent point in time compared to the point in time before the update. The schedule may specify periodically refreshing the partition. For example, a schedule may specify a periodicity at which the data of a partition is refreshed. Alternatively, the schedule may specify specific points in time at which the partition needs to be refreshed.

The database storage system associates each partition with a schedule independent of the other partitions or the schedule for the database tables of the virtual database that do not belong to any partition. For example, the schedules may specify a different periodicity for each partition and for the database tables of the virtual database that do not belong to any partition. The database storage system updates the state of each partition based on the schedule of the partition.

Importing Data from Multiple Sources in a Virtual Database Considerations

The database storage system 100 creates virtual databases that incorporate data from multiple sources. A virtual database can include data stored in partitions of different source databases stored as snapshots on the database storage system 100. A virtual database can include data of multiple source databases stored as snapshots on the database storage system 100. The multiple sources of data included in a virtual database can be data from different point-in-time copies of the same source database that are stored as snapshots in the database storage system 100.

Figure 7:
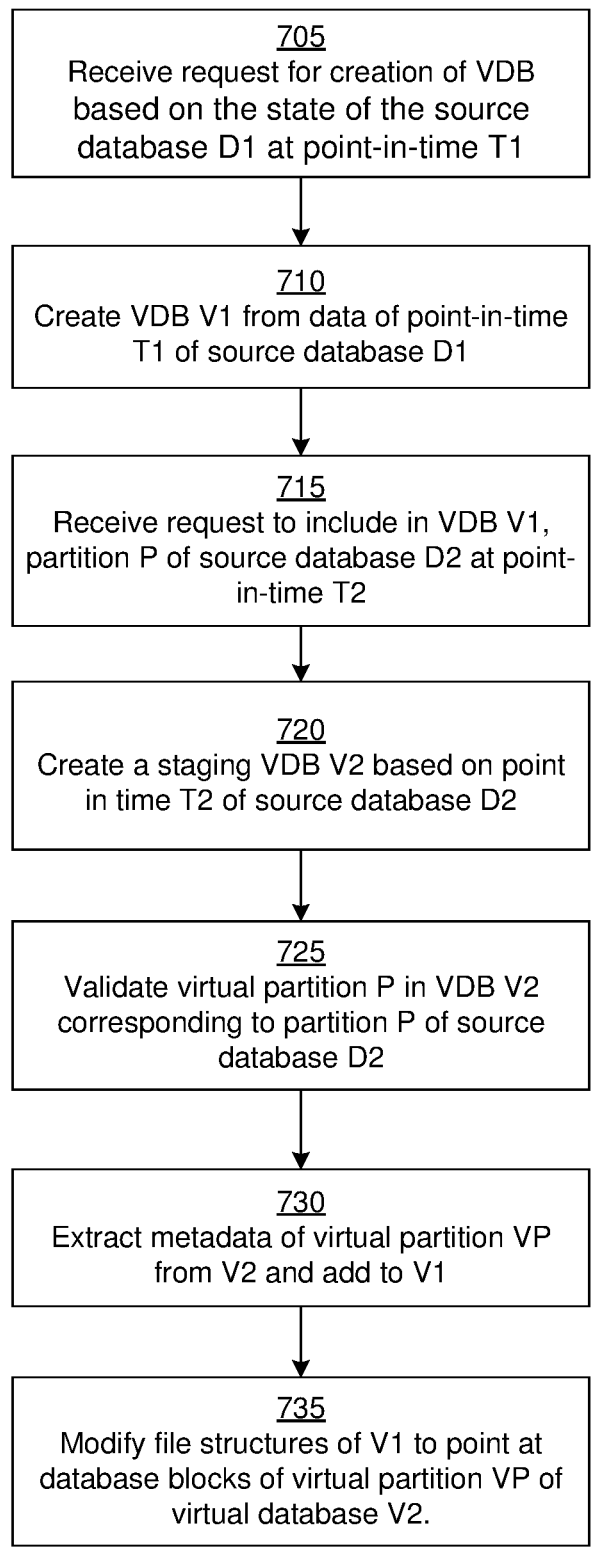
FIG. 7 shows a flowchart illustrating the process of creating a virtual database based on a source database and incorporating a partition of another source database in the virtual database, according to an embodiment.

FIG. 7 shows a flowchart illustrating the process of creating a virtual database based on a source database and incorporating a partition of another source database in the virtual database, according to an embodiment. The database storage system 100 stores snapshots representing various point-in-time copies of a source database D1 and a source database D2. The point-in-time copies of each source database may be received based on a schedule independent of the other source databases.

The virtual database manager 250 receives 705 a request to create a virtual database based on the state of the source database D1 at point-in-time T1. The virtual database manager 250 identifies a snapshot of the source database stored in the storage system data store 290 associated with the point-in-time T1. The snapshot may store data of the source database D1 obtained at point in time T1 or the snapshot may be the most recent snapshot that was obtained before the point-in-time T1. If the snapshot is the most recent snapshot obtained before the point-in-time T1, the database storage system 100 applies transaction logs obtained from the source database D1 by the transaction log manager 220 to the database blocks of the identified snapshot so as to update the database blocks to correspond to the point-in-time T1. The virtual database manager 250 creates 710 a virtual database V1 based on the database blocks of the snapshot (or the updated database blocks based on the snapshot.)

The virtual partition manager 260 receives 715 a request to include in virtual database V1, data of partition P of source database D2 at point-in-time T2. The virtual partition manager 260 identifies the most recent snapshot of source database D2 stored in the storage system data store 290 that represents data of D2 before point-in-time T2. If any updates were made to the data of the source database since the identified snapshot was captured, the virtual database manager 250 applies transaction logs of the source database D2 to update the database blocks of the identified snapshot to correspond to the state of the source database D2 at point-in-time T2.

The virtual database manager 250 creates a staging virtual database V2 based on database blocks stored in the storage system data store 290 corresponding to state of source database D2 at point-in-time T2. The staging virtual database V2 includes a virtual partition VP corresponding to partition P of source database D2. The partition validation module 235 validates the virtual partition VP in the staging virtual database V2. The partition validation module 235 determines that the virtual partition VP is a valid partition if the database tables of the virtual partition VP do not have foreign keys referring to data stored in database tables outside the partition.

The partition import module 225 extracts metadata of virtual partition VP from V2 and updates the metadata of virtual database V1 to include the metadata describing virtual partition VP. The metadata describing the virtual partition VP includes description of the database tables of the virtual partition VP, description of any relations within the database tables of the virtual partition VP, for example, foreign keys. The partition import module 225 resolves any name overlaps between the database tables of the virtual partition VP and the database tables of the source database D1 by either renaming the tables of the virtual partition VP or by using a different namespace (or a different schema) for storing database tables of the partition. For example, if the source database D1 includes a table T1 and the partition P of the source database D2 also includes a table T1, the virtual partition manager 260 may rename the table T1 of the virtual partition VP based on certain naming convention (say, rename table T1 of virtual partition VP to table T1_partition_P.) Alternatively, the virtual partition manager 260 may store database tables of the virtual partition VP under a namespace (or schema) called VP such that table T1 of partition T can be referred to as VP.T1 (similarly all tables of namespace VP can be referred by prefixing the name of the table with "VP."

The partition import module 225 further modifies 735 the file structures of virtual database V1 so as to include the database blocks of the virtual partition VP from the staging virtual database V2. The partition import module 225 includes the database blocks of virtual partition VP of staging virtual database V2 by updating files of the virtual database V1 to point at the database blocks of the virtual partition VP from the staging virtual database V2. Accordingly, the virtual partition VP is included in the virtual database V1 (as a virtual partition) without requiring any copying of the database blocks. Furthermore, no additional data storage is required as a result of including the virtual partition P in the virtual database V1 (other than the metadata and pointers to database blocks of the virtual partition.) Also, the virtual partition VP in the virtual database may share database blocks with the corresponding virtual partitions in other virtual databases. Database blocks of the virtual partition VP are copied if a write operation is performed on database tables of the virtual partition VP of the virtual database V1. Until a write operation is performed, the database block may be shared with one or more other virtual databases.

The process illustrated in FIG. 7 allows the database storage system 100 to create virtual databases based on a particular source database to include partitions from other source databases. A virtual database created may include one or more partitions from other source databases. The database storage system 100 further allows refresh and rewind operations on each virtual partition included in the virtual databases. The refresh and rewind operations may be performed on each virtual partition independent of the refresh/rewind operation on other virtual partitions. For example, a system administrator may specify a schedule for refreshing data of each virtual partition at a rate that is different from that of the other virtual partitions.

In an embodiment, the virtual database manager 250 allows creation of an empty virtual database. The empty virtual database is a template of a virtual database that does not include database blocks based on stored snapshots in the storage system data store 290. An empty virtual database can be considered as an empty shell used to store data of one or more source databases at a later point in time (after creation of the empty virtual database.) The data of the different source databases may be partitions of source databases or complete source databases. Once data from different source databases is included in the empty virtual database, the database storage system 100 can receive and process queries based on the data. These queries may process data of a particular source database or data of multiple source databases, for example, by joining database tables belonging to two different source databases.

Figure 8:
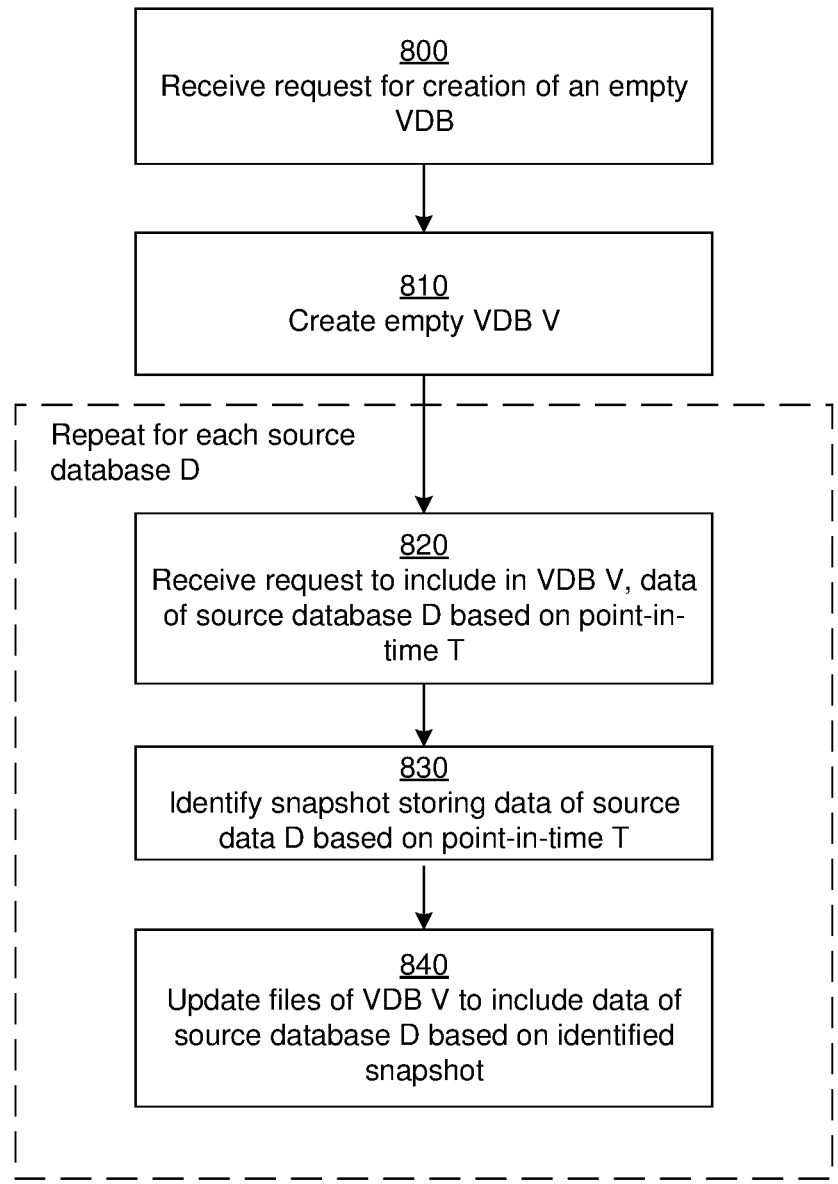
FIG. 8 shows a flowchart illustrating the process of creating an empty virtual database and incorporating multiple source databases in the empty virtual database, according to an embodiment.

FIG. 8 shows a flowchart illustrating the process of creating an empty virtual database and incorporating multiple source databases in the empty virtual database, according to an embodiment. The virtual database manager 250 receives 800 a request to create an empty virtual database. The virtual database manager 250 creates 810 the requested empty virtual database as virtual database V. The empty virtual database V is not associated with any source database. The virtual database manager 250 creates certain metadata tables for the virtual database V. These metadata tables are configured to store metadata describing database tables that can be added to the virtual database.

The virtual partition manager 260 includes data from multiple source databases in the empty virtual database V. For each source database D, the virtual partition manager 260 performs the following steps. The virtual partition manager 260 receives 820 a request to include data of a source database D corresponding to point-in-time T. In this process, the virtual partition module 260 treats the entire source database as a partition. The virtual database manager 250 identifies 830 a snapshot of source database D corresponding to the point-in-time T. The snapshot may store the data of source database corresponding to point-in-time T or may be a snapshot taken before point-in-time T (e.g., the most recent snapshot taken before point-in-time T.) The virtual database manager 250 updates 840 the database blocks of the identified snapshot such that the updated database blocks correspond to data of the source database at point-in-time T. The steps 820, 830, and 840 are repeated for other source databases.

The partition import module 225 updates 840 the files of the empty virtual database include data of the identified snapshot. Once data of a snapshot is included in the virtual database, the virtual database is not empty any more. Accordingly, the first snapshot of a source database is included in an empty virtual database, but the subsequent snapshots are included in a virtual database that is not empty.

The partition import module 225 updates 840 the files of the virtual database V by including metadata describing the database tables of the new source database being included. In an embodiment, the partition import module 225 renames database tables to avoid conflicts between the database tables being included and database tables previously included. In other embodiments, the partition import module 225 includes the database tables of each source database in a schema or namespace to avoid name conflicts with database tables of other source databases being included.

The partition import module 225 dos not copy database blocks of each source database being included in the virtual database. The partition import module 225 updates the files of the virtual database V to point at the database blocks of a snapshot stored in the storage system data store 290. Accordingly, snapshots of multiple databases can be included efficiently (in terms of fast execution) without requiring significant additional storage.

The database storage system 100 may include the same source database may be included in multiple virtual databases. For example, the database storage system may create a virtual database Vx including snapshots of source databases D1 and D2 and another virtual database Vy including snapshots of source databases D2 and D3. Both virtual databases share database blocks of source database D2. Furthermore, data of different source databases corresponding to different points in time may be included. For example, in the above example, Vx may include snapshot of source database D1 taken at point-in time T11 and snapshot of source database D2 taken at point-in time T12. The virtual database Vy may include snapshot of source database D2 taken at point-in time T22 and snapshot of source database D3 taken at point-in time T23. Accordingly, the data of source databases D2 included in Vx corresponds to point-in-time T12 but the data of source database D2 included in Vy corresponds to point-in-time T22. However, the data of source database included in Vx and Vy may still share database blocks even if they correspond to different points in time.

Figure 9:
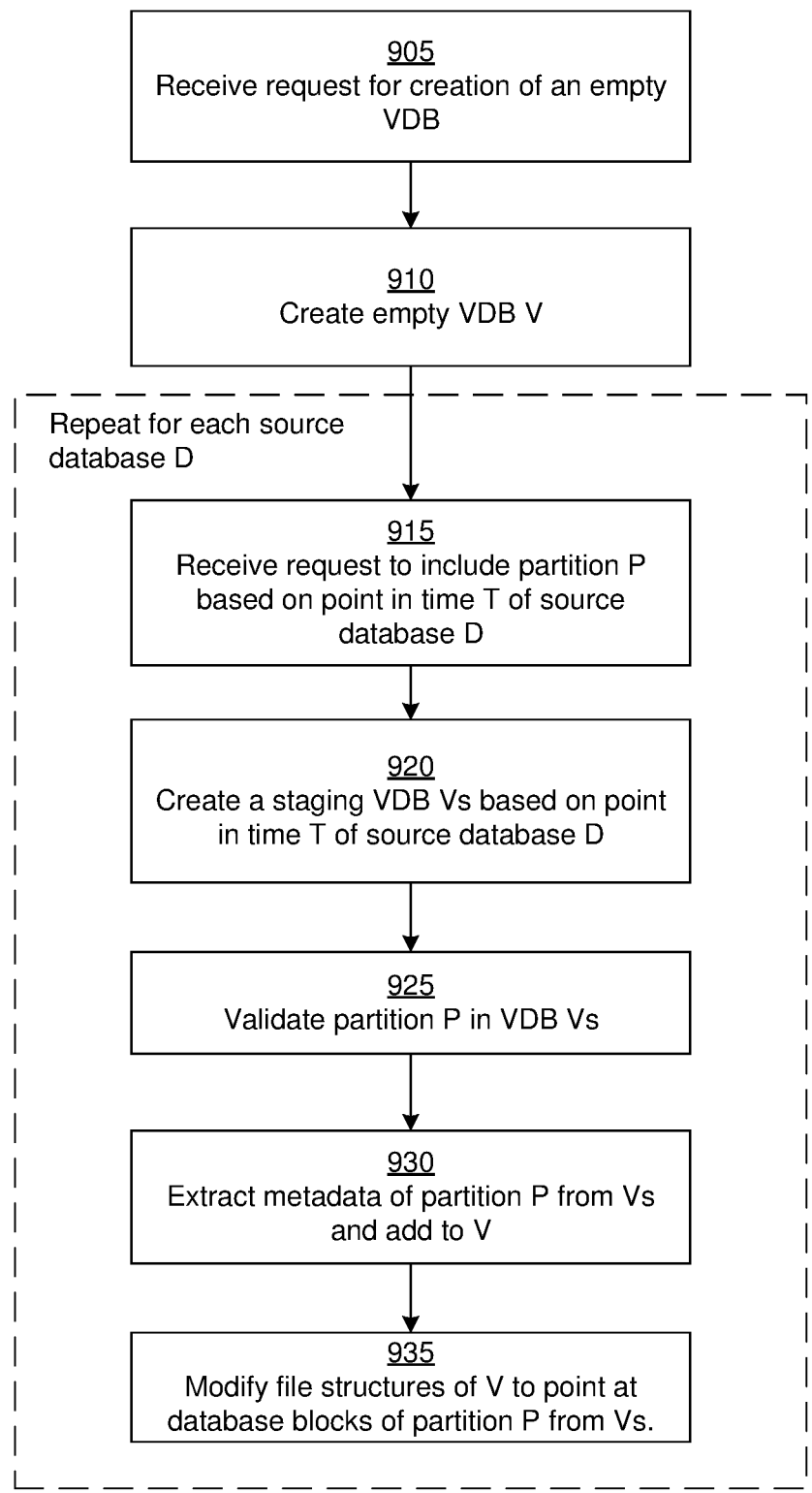
FIG. 9 shows a flowchart illustrating the process of creating an empty virtual database and incorporating partitions from multiple source databases in the empty virtual database, according to an embodiment.

FIG. 9 shows a flowchart illustrating the process of creating an empty virtual database and incorporating partitions from multiple source databases in the empty virtual database, according to an embodiment. Similar to the process illustrated in FIG. 8, the virtual database manager 250 receives 905 a request to create an empty virtual database and creates 910 the requested virtual database V.

The database storage system 100 performs the following steps to include partitions from different source databases into the empty virtual database V. The virtual partition manager 260 receives 915 a request to include a partition P based on point-in-time T of a source database D. The virtual database manager 250 creates 920 a staging virtual database Vs based on data of the source database corresponding to point-in-time T. The partition validation module 235 validates 925 the partition P in the staging virtual database Vs. The validation step is similar to step 725 of the process illustrated in FIG. 7. The partition import module 930 extracts 930 metadata of partition P from virtual database Vs and includes it in virtual database V. This step is similar to step 730 of the process illustrated in FIG. 7. The partition import module 225 modifies 935 the file structures of virtual database V to point at the database blocks of partition P of staging virtual database Vs. This step is similar to step 735 of the process illustrated in FIG. 7.

Accordingly, the database storage system 100 executes the process illustrated in FIG. 9 to include subsets of data of different source databases in an empty virtual database. In particular, partitions of different source databases can be included in the empty virtual database. The database storage system 100 can further execute queries that combine data from different partitions, for example, by joining a database table of a partition from source database D1 with a table of a partition of source database D2. The partitions are represented in the virtual database V as virtual partitions and accordingly share database blocks with corresponding partitions of other virtual databases. The database storage system 100 further allows user to refresh/rewind each partition independent of other partitions and based on a schedule independent of schedules of other partitions. In some embodiments, the virtual database V is not an empty virtual database but a virtual database based on a point-in-time copy of a source database stored in the storage system data store 290.

Figure 10:
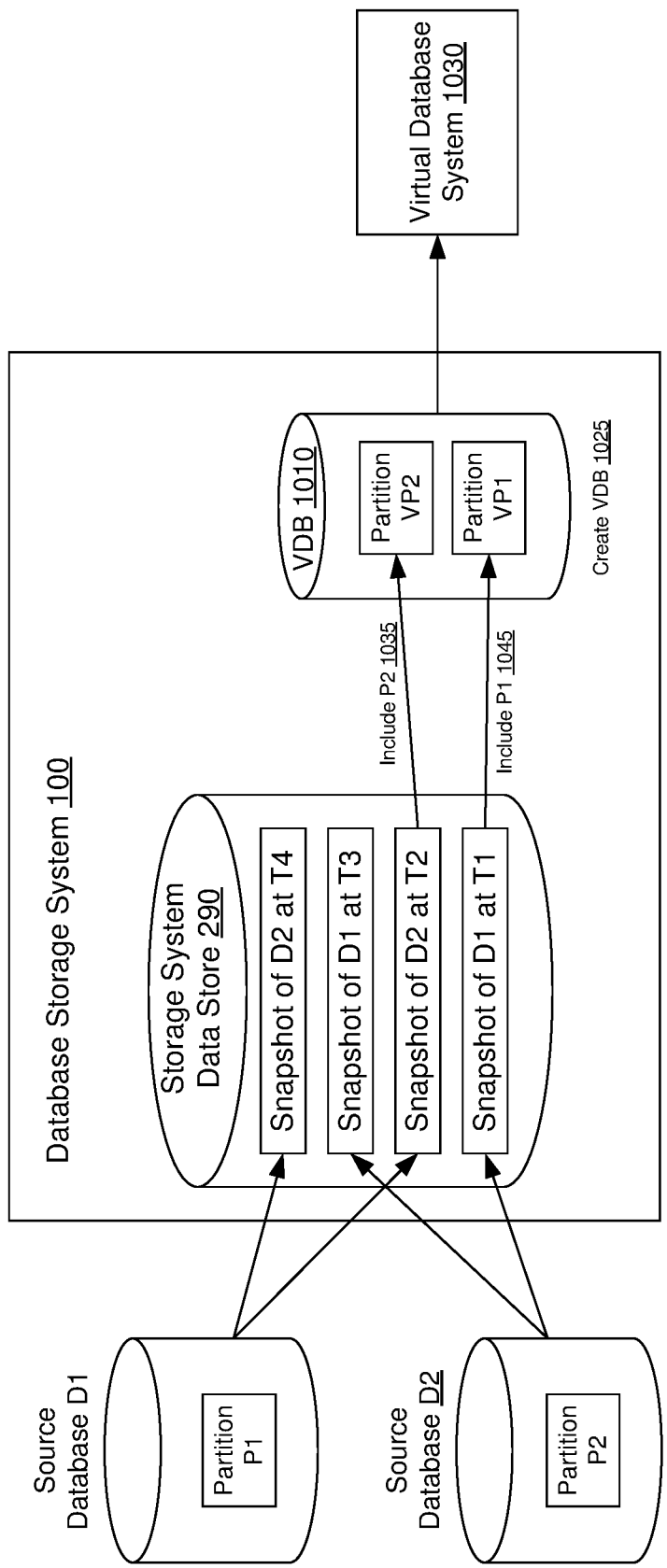
FIG. 10 illustrates a virtual database that incorporates virtual partitions from different source databases, according to an embodiment of the invention.

FIG. 10 illustrates a virtual database that incorporates virtual partitions from different source databases, according to an embodiment of the invention. FIG. 10 shows two source databases D1 and D2. The source database D2 includes a partition P1 and the source database D2 includes a partition P2. The storage system data store 290 of the database storage system 100 stores snapshots of source databases D1 and D2 taken at various points in time.

As shown in FIG. 10, the storage system data store 290 of the database storage system 100 stores snapshots of source database D1 corresponding to points-in-time T2 and T4 and snapshots of source database D2 corresponding to points-in-time T1 and T3. The storage system data store 290 may include more or less number of snapshots of each source database and may include snapshots of other source databases as well. The database storage system 100 creates the virtual database 1010. The database storage system 100 provides the virtual database system 1030 with read and write access to the virtual database 1010. The virtual database 1010 may be created 1025 as an empty virtual database or may be based on a point-in-time copy of a source database (either D1, or D2, or another database).

The virtual database 1010 illustrates including multiple partitions in a virtual database, each virtual partition based on data of a different source database. The virtual database 1010 includes 1045 virtual partition VP1 corresponding to snapshot of source database D1 corresponding to point-in-time T1. The virtual database 1010 also includes 1035 virtual partition VP2 corresponding to snapshot of source database D2 corresponding to point-in-time T2. The virtual database 1010 may include more or less partitions than shown in FIG. 10.

The database storage system 100 allows modifying each virtual partition independent of the other virtual partition to correspond to a different point-in-time of the source database. For example, the database storage system 100 may refresh virtual partition VP1 to correspond to the snapshot of D2 corresponding to point in time T3. Similarly, the database storage system 100 may refresh virtual partition VP2 to correspond to the snapshot of D2 corresponding to point in time T4.

Figure 11:
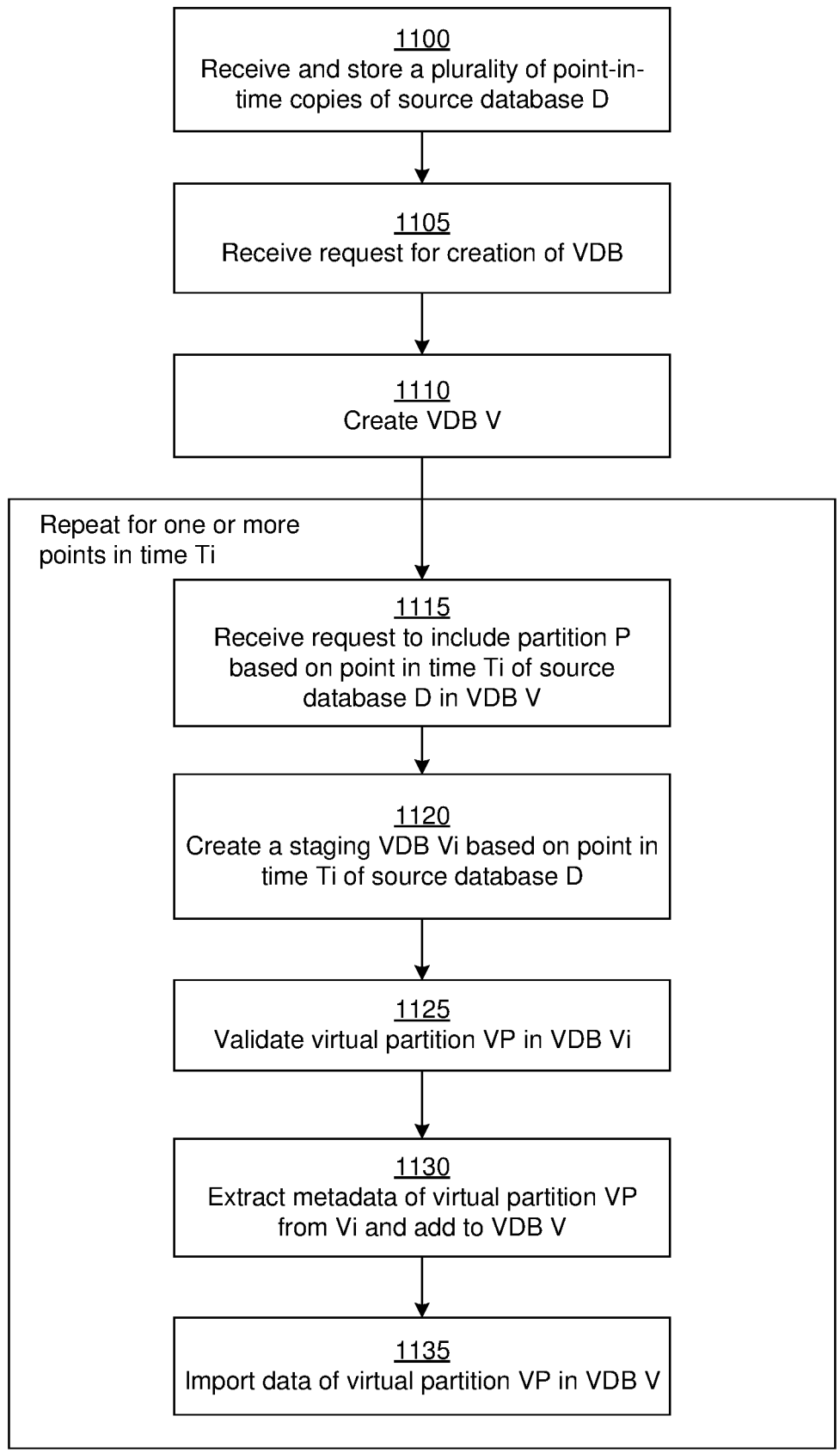
FIG. 11 shows a flowchart illustrating the process of including multiple versions of the same partition (or source database) corresponding to different points in time in the same virtual database, according to an embodiment.

FIG. 11 shows a flowchart illustrating the process of including multiple versions of the same partition (or source database) corresponding to different points in time in the same virtual database, according to an embodiment. The storage system 100 receives 1100 and stores a plurality of point in time copies of a source database in the storage system data store 290. The source database is assumed to include a partition P comprising a set of database tables. The step 1100 is similar to step 300 of FIG. 3.

The virtual database manager 250 receives 1105 a request to create a virtual database and creates 1110 the requested virtual database V. The request may be for creation of an empty virtual database and accordingly, the virtual database manager 250 creates 1110 an empty virtual database V. Alternatively, the request may be for creation of a virtual database based on a point in time T associated with a source database and accordingly, the virtual database manager 250 creates 1110 an virtual database V based on a point in time copy of the source database associated with time T.

The database storage system 100 repeats the following steps for different points in time associated with a source database D. The virtual partition manager 260 receives 1115 a request to include partition P based on a particular point in time (say point-in-time Ti) of source database D. The virtual database manager 250 creates 1120 a staging virtual database Vi based on point-in-time Ti.

The virtual database manager 250 identifies the most recent point-in-time copy stored in the storage system data store 290 that represents a state of the source database D before point-in-time Ti. If the identified point-in-time copy represents the state of the source database at point-in-time Ti, the virtual database manager 250 creates 1120 the staging virtual database Vi based on database blocks of the point-in-time copy. If the identified point-in-time copy represents the state of the source database earlier than point-in-time Ti, the transaction log manager 220 modifies the database blocks of the point-in-time copy by applying transaction logs stored in the storage system data store 290 to the identified point-in-time copy. The virtual database manager 250 creates 1120 the staging virtual database Vi based on the modified database blocks. The database storage system 100 modifies a database block of a point-in-time copy by creating a copy of the database block and modifying the copy, thereby leaving the original database block unmodified (for use later).

The partition validation module 235 validates 1125 the virtual partition VP in the staging virtual database Vi. The partition validation module 235 validates the virtual partition VP by verifying that the database tables in the partition do not include foreign keys that refer database tables outside the partition. The partition import module 225 extracts 1130 metadata describing partition P from the staging virtual database Vi and incorporates the metadata in the virtual database V. The partition import module 225 imports 1135 the data of the virtual partition VP from staging virtual database Vi into the virtual database V. The partition import module 225 imports 1135 the data of the virtual partition VP into the virtual database V by modifying the files of the virtual database V to point at database blocks of the staging virtual database Vi representing data of the virtual partition VP within the staging virtual database Vi. Accordingly, no database blocks are copied from the staging virtual database Vi to the virtual database V to import the virtual partition VP to the virtual database V.

The database storage system 100 may repeat the steps 1115, 1120, 1125, 1130, 1135 multiple times, thereby importing different versions of the partition P corresponding to different points in time Ti of the source database into the virtual database V. The virtual partition manager 260 ensures that there are no name conflicts between the different versions of the database tables of the partition P corresponding to different points in time imported into the same virtual database V. The virtual partition manager 260 avoids name conflicts by either renaming the different versions of the same table or by using a different schema or name space for storing each version of the partition.

Figure 12:
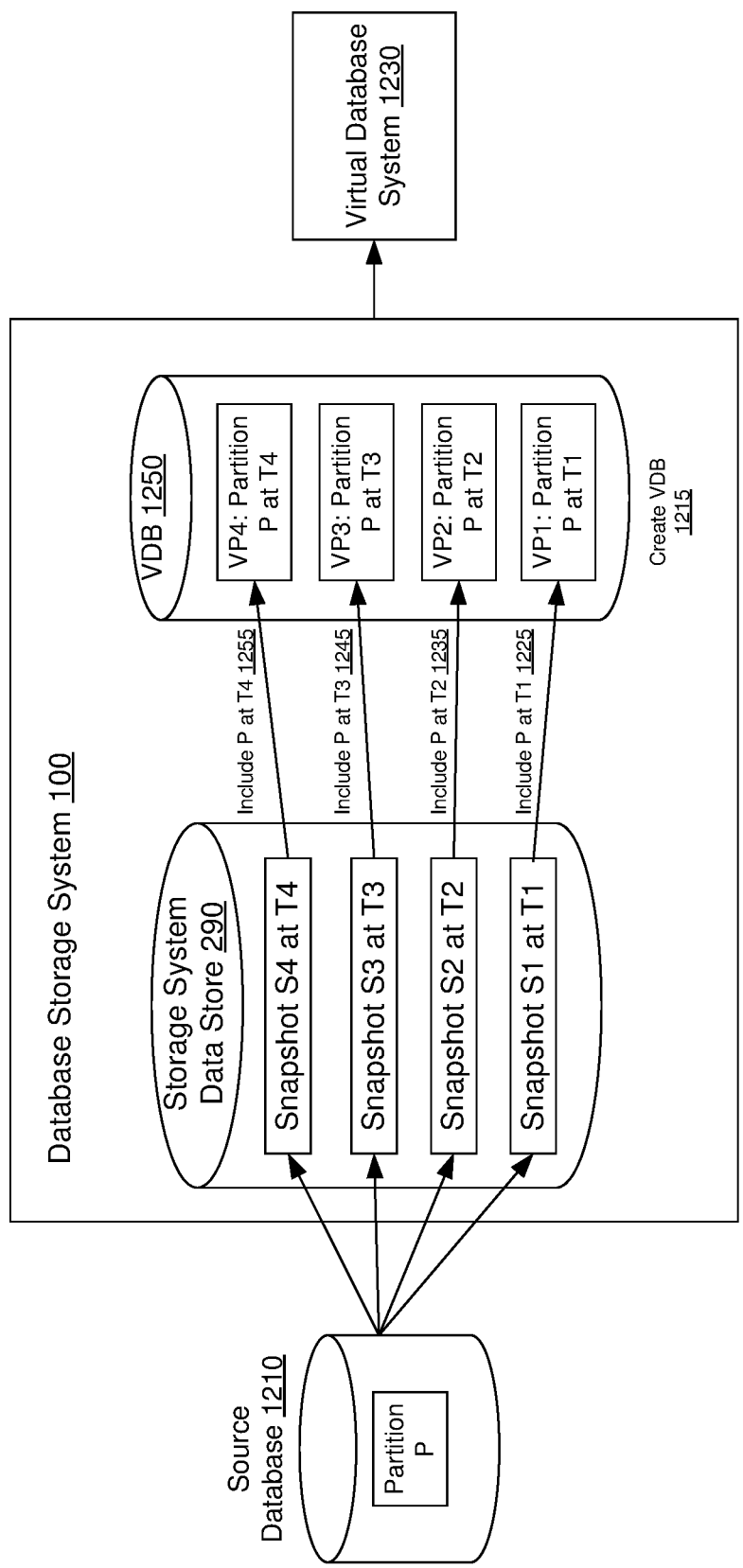
FIG. 12 illustrates a virtual database that incorporates multiple versions of the same partition (or source database) corresponding to different points in time in the same virtual database, according to an embodiment of the invention.

FIG. 12 illustrates a virtual database that incorporates multiple versions of the same partition (or source database) corresponding to different points in time in the same virtual database, according to an embodiment of the invention. The storage system data store 290 of the database system 100 stores multiple snapshots comprising point-in-time copies of the source database 1210. These include the snapshot S1 storing data of source database 1210 corresponding to point-in-time T1, snapshot S2 storing data of source database 1210 corresponding to point-in-time T2, snapshot S3 storing data of source database 1210 corresponding to point-in-time T3, and snapshot S4 storing data of source database 1210 corresponding to point-in-time T4. The various snapshots may share database blocks. The source database 1210 includes a partition P. Accordingly, each snapshot includes data of the partition P corresponding to the associated point in time. The data of each partition from a snapshot may be shared with data of the partition from other snapshots.

The database storage system 100 creates 1215 the virtual database 1250 for access by the virtual database system 1230. The database storage system 100 imports data of partition P from the various snapshots into the virtual database 1250. As shown in FIG. 12, the virtual database 1250 includes 1225 virtual partition VP1 that represents partition P at point-in-time T1, virtual partition VP2 that represents partition P at point-in-time T2, virtual partition VP3 that represents partition P at point-in-time T3, and virtual partition VP4 that represents partition P at point-in-time T4. The various virtual partitions VP1, VP2, VP3, and VP4 can share database blocks. In particular, a table T of a virtual partition corresponding to a point in time can share database blocks with representations of the table T stored in virtual partitions corresponding to other points in time within the virtual database.

Furthermore, the data of the virtual partition of a virtual database can be shared with virtual partitions of other virtual databases. Assume that the virtual database 1250 shown in FIG. 12 is virtual database V1. A second virtual database V2 may be created and partition P included in the virtual database V2 corresponding to points in time T1, T2, T3, and T4. If no database blocks are updated by V1 and V2, all database blocks storing data of the partition P of virtual database V1 may be shared by the partition P of virtual database V2. If some database blocks of one of the virtual database are updated, only the updated databases are stored separately compared to the other virtual database.

Furthermore, a virtual database V3 may include some (not necessarily all) partitions corresponding to various points in time compared to V1 and/or V2. For example, V3 may include partitions VP1, VP2, and VP3 corresponding to points in time T1, T2, and T3 (but not T4.) Accordingly, virtual database V3 shares partitions VP1, VP2, and VP3 shown in FIG. 13 with virtual database V1. Similarly, a virtual database V4 may be created that includes partitions VP2, VP3, and VP4 corresponding to points in time T2, T3, and T4 (but not T1.) Accordingly, virtual database V4 shares partitions VP2, VP3, and VP4 shown in FIG. 13 with virtual database V1. Furthermore V4 shares partitions VP2 and VP3 with virtual database V3.

Two virtual databases may share database blocks even if they do not include the same set of partitions. For example, assume that virtual database V5 includes partition P1 and virtual database V6 includes partition P2. These two virtual databases may not share the same partitions logically. However, the underlying data storage of partitions P1 and P2 may share database blocks. Accordingly, virtual databases V5 and V6 share database blocks even if they do not logically share the same partition.

Figure 13:
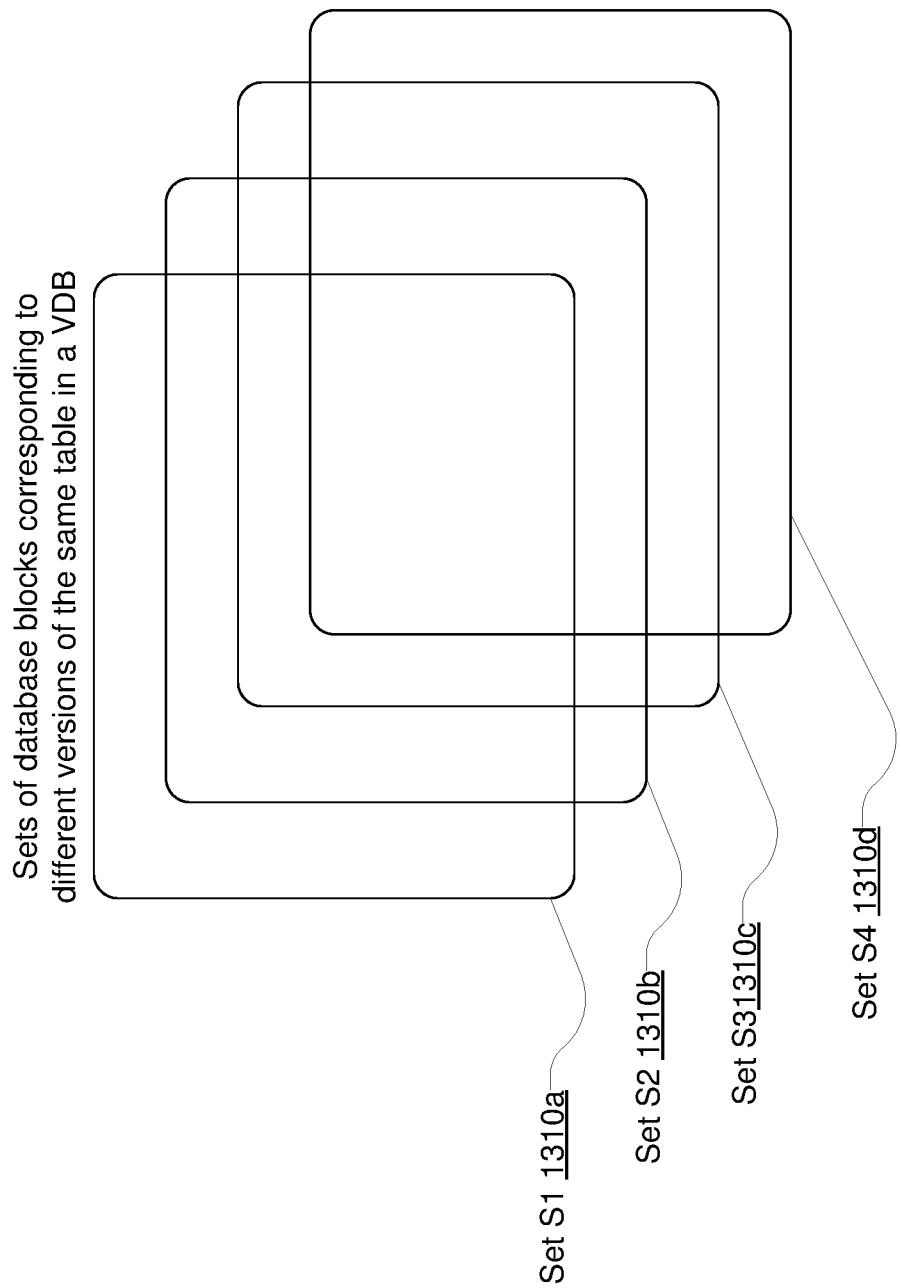
FIG. 13 illustrates sharing of database blocks by different versions of the same table stored in a virtual database, according to an embodiment of the invention.

FIG. 13 illustrates sharing of database blocks by different versions of the same table stored in a virtual database, according to an embodiment of the invention. Assume that the source database includes a table X (that belongs to partition P.) The virtual database 1250 shown in FIG. 12 includes different versions of table X corresponding to each partition P1, P2, P3, and P4. Assume that the version of table X in partition P1, P2, P3, and P4 are called X1, X2, X3, and X4 respectively. As shown in FIG. 13, these versions of table X may store data as different sets of database blocks stored in the storage system data store 290.

The sets S1, S2, S3, and S4 represent database blocks of tables X1, X2, X3, and X4 respectively. The different sets S1, S2, S3, and S4 are overlapping. If the table X is not frequently updated between two points in time T1 and T2, the versions of the table X corresponding to these points in time, for example, X1 and X2 have greater overlap of database blocks.

A virtual database system 1230 may receive and process queries that access data of one or more versions of table X. The virtual database system 1230 may process a database query that joins two or more versions of the table X or perform other operations such as union, intersection, and so on across different versions of the table. For example, the virtual database system 1230 may receive and process queries that determine different of data in the two tables X1 and X2 (or between tables X2 and X3, or between tables X3 and X4, and so on).

For example, the table X may store information describing certain activity of a business, for example, sales of an organization, inventory of the organization, all transactions of a business and so on. Each version of the database table X obtained from the source database represents the data of the table X at certain point in time. For example, a partition storing table X may be stored in the virtual database 1250 for each month. The virtual database system 1230 may receive and process queries that compare the data (e.g., sales, inventory, etc.) across month. For example, a user may query the virtual database system 1230 to determine whether sales increased/decreased from one month to another.

If the virtual database system 1230 loads the data of two or more versions of the table X (e.g., X1, X2, X3, X4, etc.) the virtual database system 1230 shares database blocks of the table in memory. For example, if tables X1 and X2 share 90% of database blocks, the amount of storage required for storing the tables X1 and X2 in memory is approximately 10% more than the data of a single table along with storage required for storing metadata of each table in-memory of required. Accordingly, loading database blocks of one version of the table also results in data of other versions of tables being loaded in memory. As a result, amount of memory required for storing the data of the tables is less compared to conventional databases. Furthermore, the processing of the queries is more efficient since amount of time required is reduced since loading database block for one version of table (say X1) also results in loading database blocks of another version of the table (say X2). Accordingly, a query that processes different versions of the table is executed more efficiently.

In an embodiment, the database storage system 100 receives and processes a query that processes two versions of the same table (i.e., a first version and a second version of the table). The first version and the second version share database blocks in the storage system data store 290. The database storage system 100 loads a portion of a first version of the table by loading one or more database blocks in memory (for example, in a cache with fast access time.) The database storage system 100 loads a portion of the second version in memory. The database storage system 100 identifies database blocks of the portion of the second version to load. The database storage system 100 checks if the database blocks are previously loaded as a result of loading the portion of the first version of the table. If the database storage system 100 determines that the identified database blocks of the second version correspond to database blocks of the first version already loaded in memory, the database storage system 100 uses the loaded database blocks of the first version as representing data of the second version of the table. Accordingly, the first and second versions of the database table share in-memory storage during the processing of the database query.

Although embodiments described herein refer to database tables and relational databases, concepts described herein are applicable to other types of database that may not be relational. For example, a partition can be a set of any type of datasets (or database objects) so long as the dataset does not refer to datasets outside the partition. A dataset refers to another dataset by specifying a constraint indicating that values within the dataset (or a subset of the dataset) are restricted to values that occur in the other dataset.

Accordingly, embodiments of the database storage system allow users to import partitions comprising sets of datasets of any kind in a virtual database. The partition (or partitions) are stored in a source database. The database storage system allows data of partition stored in the virtual database to be rewinded to an earlier state or refreshed to a more recent state. The database storage system allows different versions of the partition to be imported into the same virtual database. The database storage system receives queries that combine information stored in datasets from two or more different versions of the same dataset (occurring in different versions of a partition.)

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating virtual databases from point-in-time copies of production databases stored in a storage manager. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method for creating a virtual database system, the method comprising:
    storing on a storage system, database blocks for a plurality of snapshots of a source database, wherein the source database stores a partition comprising a set of database tables, wherein each snapshot represents a state of the source database at a point in time, wherein at least some of the stored database blocks of a snapshot are shared with one or more other snapshots of the source database;
    creating a virtual database represented by a set of files, the virtual database sharing one or more database blocks with one or more other virtual databases;
    importing a plurality of versions of the partition into the virtual database comprising:
        importing a first version of the partition into the virtual database comprising:
            updating the metadata of the virtual database to describe database objects of the first version of the partition; and
            modifying the set of files of the virtual database to point at database blocks of the first version of the partition stored in the storage system;
        importing a second version of the partition into the virtual database comprising:
            updating the metadata of the virtual database to describe database objects of the second version of the partition; and
            modifying the set of files of the virtual database to point at database blocks of the second version of the partition stored in the storage system, wherein the database blocks of the second version of the partition share one or more database blocks with the first version of the partition; and
    processing data of the plurality of versions of the partitions in response to database queries received by the virtual database.

2. The method of claim 1, wherein processing data of the plurality of versions of the partitions in response to database queries received by the virtual database comprises:
    receiving a query identifying a particular table, the query processing data of the particular table from the first version of the partition and data of the particular table from the second version of the partition; and
    executing the query to generate a result set based on the data of the particular table from the first version of the partition and the data of the particular table from the second version of the partition.

3. The method of claim 1, wherein executing the query comprises:
    receiving a request to load in memory, one or more database blocks of the table from the first version of the partition; and
    loading in memory, one or more database blocks of the table from the first version of the partition;
    receiving a request to load in memory one or more database blocks of the table from the second version of the partition; and
    determining whether the one or more database blocks of the table from the second version of the partition match the one or more database blocks of the table from the first version of the partition previously loaded in memory; and
    responsive to determining that the one or more database blocks of the table from the second version of the partition match the previously loaded one or more database blocks of the table from the first version of the partition, reusing the previously loaded one or more database blocks of the table from the first version of the partition as database blocks of the table from the second version of the partition.

4. The method of claim 1, further comprising:
    validating the partition by checking if the database tables in the partition refer to database tables outside the partition; and
    responsive to determining that a database table in the partition refers to a database table outside the partition, returning error indicating failure to perform import operation.

5. The method of claim 4, wherein validating a partition comprises:
    creating a staging virtual database based on the point in time associated with the partition; and
    checking if the database tables in the partition refer to database tables outside the partition using the staging virtual database.

6. The method of claim 1, further comprising:
    performing import of a third version of the partition into the virtual database comprising:
        updating the metadata of the virtual database to describe database objects of the third version of the partition; and
        modifying the set of files of the virtual database to point at database blocks of the third version of the partition stored in the storage system, wherein the database blocks of the third version of the partition share one or more database blocks with the first version of the partition and the second version of the partition.

7. The method of claim 1, wherein the partition is a first partition and the source database comprises a second partition, the method further comprising:
    performing import of a version of the second partition into the virtual database comprising:
        updating the metadata of the virtual database to describe database objects of the version of the second partition; and
        modifying the set of files of the virtual database to point at database blocks of the version of the second partition stored in the storage system, wherein the database blocks of the version of the second partition share one or more database blocks with other versions of the second partition.

8. A non-transitory computer-readable storage medium storing instructions for:
    storing on a storage system, database blocks for a plurality of snapshots of a source database, wherein the source database stores a partition comprising a set of database tables, wherein each snapshot represents a state of the source database at a point in time, wherein at least some of the stored database blocks of a snapshot are shared with one or more other snapshots of the source database;
    creating a virtual database represented by a set of files, the virtual database sharing one or more database blocks with one or more other virtual databases;
    importing a plurality of versions of the partition into the virtual database comprising:
        importing a first version of the partition into the virtual database comprising:
            updating the metadata of the virtual database to describe database objects of the first version of the partition; and
            modifying the set of files of the virtual database to point at database blocks of the first version of the partition stored in the storage system;
        importing a second version of the partition into the virtual database comprising:
            updating the metadata of the virtual database to describe database objects of the second version of the partition; and
            modifying the set of files of the virtual database to point at database blocks of the second version of the partition stored in the storage system, wherein the database blocks of the second version of the partition share one or more database blocks with the first version of the partition; and
    processing data of the plurality of versions of the partitions in response to database queries received by the virtual database.

9. The non-transitory computer-readable storage medium of claim 8, wherein instructions for processing data of the plurality of versions of the partitions in response to database queries received by the virtual database comprise instructions for:
    receiving a query identifying a particular table, the query processing data of the particular table from the first version of the partition and data of the particular table from the second version of the partition; and
    executing the query to generate a result set based on the data of the particular table from the first version of the partition and the data of the particular table from the second version of the partition.

10. The non-transitory computer-readable storage medium of claim 8, wherein instructions for executing the query comprise instructions for:
    receiving a request to load in memory, one or more database blocks of the table from the first version of the partition; and
    loading in memory, one or more database blocks of the table from the first version of the partition;

receiving a request to load in memory one or more database blocks of the table from the second version of the partition; and determining whether the one or more database blocks of the table from the second version of the partition match the one or more database blocks of the table from the first version of the partition previously loaded in memory; and responsive to determining that the one or more database blocks of the table from the second version of the partition match the previously loaded one or more database blocks of the table from the first version of the partition, reusing the previously loaded one or more database blocks of the table from the first version of the partition as database blocks of the table from the second version of the partition.

11. The non-transitory computer-readable storage medium of claim 8, wherein the stored instructions further comprise instruction for:

validating the partition by checking if the database tables in the partition refer to database tables outside the partition; and responsive to determining that a database table in the partition refers to a database table outside the partition, returning error indicating failure to perform import operation.

12. The non-transitory computer-readable storage medium of claim 11, wherein instructions for validating a partition comprise instructions for:

creating a staging virtual database based on the point in time associated with the partition; and checking if the database tables in the partition refer to database tables outside the partition using the staging virtual database.

13. The non-transitory computer-readable storage medium of claim 8, wherein the stored instructions further comprise instruction for:

performing import of a third version of the partition into the virtual database comprising:

updating the metadata of the virtual database to describe database objects of the third version of the partition; and modifying the set of files of the virtual database to point at database blocks of the third version of the partition stored in the storage system, wherein the database blocks of the third version of the partition share one or more database blocks with the first version of the partition and the second version of the partition.

14. The non-transitory computer-readable storage medium of claim 8, wherein the partition is a first partition and the source database comprises a second partition, wherein the stored instructions further comprise instruction for:

performing import of a version of the second partition into the virtual database comprising:

updating the metadata of the virtual database to describe database objects of the version of the second partition; and modifying the set of files of the virtual database to point at database blocks of the version of the second partition stored in the storage system, wherein the database blocks of the version of the second partition share one or more database blocks with other versions of the second partition.

15. A computer system comprising:
one or more processors; and
a non-transitory computer-readable storage medium storing instructions for:

storing on a storage system, database blocks for a plurality of snapshots of a source database, wherein the source database stores a partition comprising a set of database tables, wherein each snapshot represents a state of the source database at a point in time, wherein at least some of the stored database blocks of a snapshot are shared with one or more other snapshots of the source database;

creating a virtual database represented by a set of files, the virtual database sharing one or more database blocks with one or more other virtual databases;

importing a plurality of versions of the partition into the virtual database comprising:

importing a first version of the partition into the virtual database comprising:

updating the metadata of the virtual database to describe database objects of the first version of the partition; and modifying the set of files of the virtual database to point at database blocks of the first version of the partition stored in the storage system;

importing a second version of the partition into the virtual database comprising:

updating the metadata of the virtual database to describe database objects of the second version of the partition; and modifying the set of files of the virtual database to point at database blocks of the second version of the partition stored in the storage system, wherein the database blocks of the second version of the partition share one or more database blocks with the first version of the partition; and processing data of the plurality of versions of the partitions in response to database queries received by the virtual database.

16. The computer system of claim 15, wherein instructions for processing data of the plurality of versions of the partitions in response to database queries received by the virtual database comprise instructions for:

receiving a query identifying a particular table, the query processing data of the particular table from the first version of the partition and data of the particular table from the second version of the partition; and executing the query to generate a result set based on the data of the particular table from the first version of the partition and the data of the particular table from the second version of the partition.

17. The computer system of claim 15, wherein instructions for executing the query comprise instructions for:

receiving a request to load in memory, one or more database blocks of the table from the first version of the partition; and loading in memory, one or more database blocks of the table from the first version of the partition;

receiving a request to load in memory one or more database blocks of the table from the second version of the partition; and determining whether the one or more database blocks of the table from the second version of the partition match the one or more database blocks of the table from the first version of the partition previously loaded in memory; and responsive to determining that the one or more database blocks of the table from the second version of the partition match the previously loaded one or more database blocks of the table from the first version of the partition, reusing the previously loaded one or more database blocks of the table from the first version of the partition as database blocks of the table from the second version of the partition.

18. The computer system of claim 15, wherein the stored instructions further comprise instruction for:
   validating the partition by checking if the database tables in the partition refer to database tables outside the partition; and
   responsive to determining that a database table in the partition refers to a database table outside the partition, returning error indicating failure to perform import operation.

19. The computer system of claim 18, wherein instructions for validating a partition comprise instructions for:
   creating a staging virtual database based on the point in time associated with the partition; and
   checking if the database tables in the partition refer to database tables outside the partition using the staging virtual database.

20. The computer system of claim 15, wherein the stored instructions further comprise instruction for:
   performing import of a third version of the partition into the virtual database comprising:
      updating the metadata of the virtual database to describe database objects of the third version of the partition; and
      modifying the set of files of the virtual database to point at database blocks of the third version of the partition stored in the storage system, wherein the database blocks of the third version of the partition share one or more database blocks with the first version of the partition and the second version of the partition.

21. The computer system of claim 15, wherein the partition is a first partition and the source database comprises a second partition, wherein the stored instructions further comprise instruction for:
   performing import of a version of the second partition into the virtual database comprising:
      updating the metadata of the virtual database to describe database objects of the version of the second partition; and
      modifying the set of files of the virtual database to point at database blocks of the version of the second partition stored in the storage system, wherein the database blocks of the version of the second partition share one or more database blocks with other versions of the second partition.

\* \* \* \* \*